| (12) | United States Patent | (10) Patent No.: | US 11,092,477 B2 |
|---|---|---|---|
| | Trakhimovich | (45) Date of Patent: | Aug. 17, 2021 |

(54) PLANAR LOAD CELL ASSEMBLY

(71) Applicant: SHEKEL SCALES (2008) LTD., Beit Keshet (IL)

(72) Inventor: Michael Trakhimovich, Gan Ner (IL)

(73) Assignee: Shekel Scales (2008) LTD., Beit Keshet (IL)

( * ) Notice: Subject to any disclaimer, the term of this patent is extended or adjusted under 35 U.S.C. 154(b) by 0 days.

(21) Appl. No.: 16/907,344

(22) Filed: Jun. 22, 2020

(65) Prior Publication Data

US 2020/0326225 A1 Oct. 15, 2020

Related U.S. Application Data

(63) Continuation-in-part of application No. PCT/IB2018/060588, filed on Dec. 24, 2018.

(30) Foreign Application Priority Data

| Dec. 24, 2017 | (GB) | ................................ | 1721864 |
| Jan. 15, 2018 | (GB) | ................................ | 1800611 |
| Sep. 6, 2018 | (GB) | ................................ | 1814504 |

(51) Int. Cl.
*G01G 3/14* (2006.01)
*G01G 21/14* (2006.01)

(52) U.S. Cl.
CPC ............... *G01G 3/14* (2013.01); *G01G 21/14* (2013.01)

(58) Field of Classification Search
CPC .................................. G01G 3/14; G01G 21/14
USPC ........................................................ 177/211
See application file for complete search history.

(56) References Cited

U.S. PATENT DOCUMENTS

| 4,542,800 A | * | 9/1985 | Knothe | ................ | G01G 3/1412 |
| | | | | | 177/211 |
| 4,548,086 A | * | 10/1985 | Kastel | ..................... | G01D 5/02 |
| | | | | | 73/726 |
| 4,600,066 A | | 7/1986 | Griffen | | |
| 5,199,814 A | * | 4/1993 | Clark | ..................... | E01F 9/629 |
| | | | | | 116/63 P |
| 5,510,581 A | * | 4/1996 | Angel | .................... | G01G 3/141 |
| | | | | | 177/211 |

(Continued)

FOREIGN PATENT DOCUMENTS

EP 0771410 B1 11/2003

OTHER PUBLICATIONS

"Magnesium AM60B Cast Alloy M10602" by AZoMJul. 29, 2013: https://www.azom.com/article.aspx?ArticleID=9237 (Year: 2013).*

(Continued)

*Primary Examiner* — Alexander A Mercado
*Assistant Examiner* — Monica S Young
(74) *Attorney, Agent, or Firm* — Momentum IP; Marc Van Dyke

(57) ABSTRACT

An assembly including a load cell body having contiguous cutout windows, each formed by a pair of cutout lines and connected by a cutout base, the second window being transversely bounded by the first window, the third window being transversely bounded by the second window; measuring beams, disposed along edges of the body, each defined by a respective line of the first pair of cutout lines; first and second arrangements, each having a pair of flexure beams connected by first and second bases, respectively; a loading element, extending from the second base; and strain gages, attached to the beams.

20 Claims, 15 Drawing Sheets

(56) References Cited

U.S. PATENT DOCUMENTS

| | | | | |
|---|---|---|---|---|
| 5,929,391 A * | 7/1999 | Petrucelli | | G01G 21/23 |
| | | | | 177/211 |
| 6,555,767 B1 * | 4/2003 | Lockery | | G01G 3/1412 |
| | | | | 177/211 |
| 7,679,009 B2 * | 3/2010 | Weichao | | G01G 3/14 |
| | | | | 177/211 |
| 8,648,267 B2 * | 2/2014 | Honda | | G01G 21/23 |
| | | | | 177/211 |
| 9,046,408 B2 * | 6/2015 | Chan | | G01G 21/23 |
| 10,527,508 B2 * | 1/2020 | Berme | | G01L 5/161 |
| 10,765,936 B2 * | 9/2020 | Berme | | A61B 5/1036 |
| 10,816,419 B2 * | 10/2020 | Lisiak | | G01L 1/2243 |
| 2006/0051553 A1 | 3/2006 | Kaplo et al. | | |
| 2008/0140087 A1 * | 6/2008 | Barbagli | | B25J 13/02 |
| | | | | 606/130 |
| 2015/0096387 A1 * | 4/2015 | Berme | | G01L 1/2206 |
| | | | | 73/862.045 |
| 2015/0314507 A1 * | 11/2015 | Jang | | G01G 21/22 |
| | | | | 425/444 |
| 2019/0015702 A1 * | 1/2019 | Krebs | | A61B 5/222 |

OTHER PUBLICATIONS

Overview of materials for 2000 Series Aluminium Alloy, MATWEB http://www.matweb.com/search/DataSheet.aspx?MatGUID=2076184469d740af9f86b0d69b2e42ff (Year: 2020).*
International Search Report for PCT/IB2018/060588 dated Jun. 27, 2019.
Written Opinion for PCT/IB2018/060588 dated Jun. 27, 2019.

\* cited by examiner

FIG. 7B
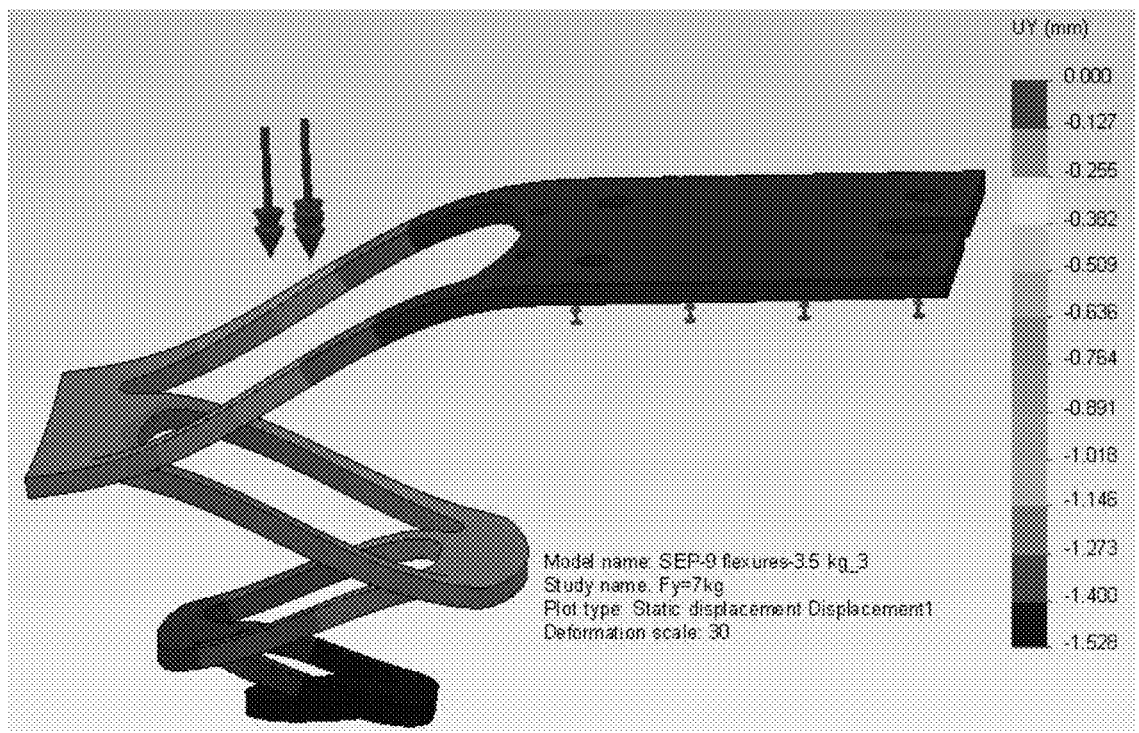
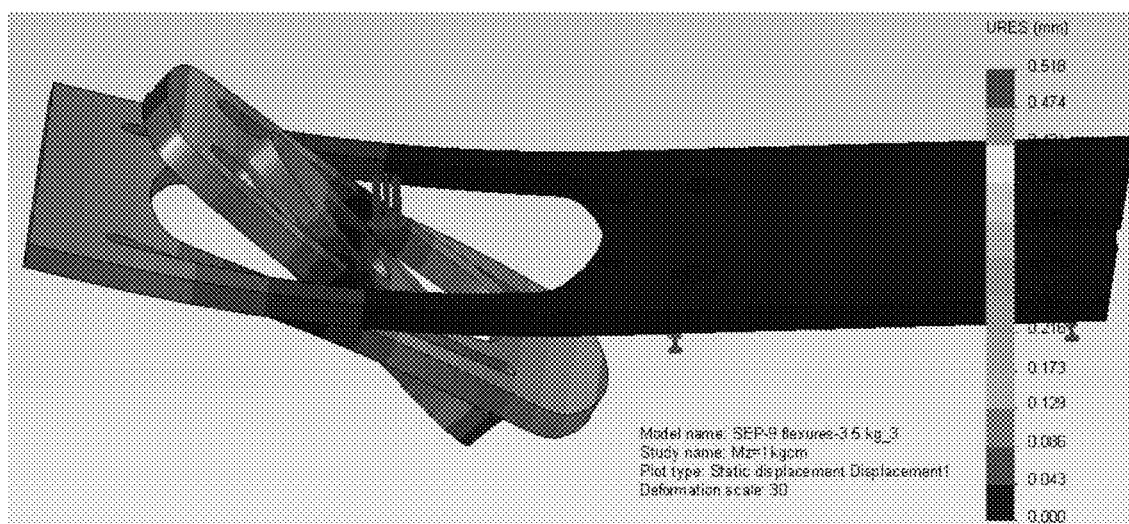
FIG. 7C

PLANAR LOAD CELL ASSEMBLY

This application is a Continuation In Part (CIP) of PCT Application No. PCT/IB2018/060588 filed Dec. 24, 2018, which application claims priority from the following patent applications: Great Britain Application Number 1721864.5, filed Dec. 24, 2017; from Great Britain Application Number 1800611.4, filed Jan. 15, 2018; and from Great Britain Application Number 1814504.5, filed Sep. 6, 2018; all of which applications are incorporated by reference for all purposes as if fully set forth herein.

FIELD AND BACKGROUND OF THE INVENTION

The present invention relates to weight measurement devices, and more particularly, to planar weighing devices employing load cell assemblies having integral flexures.

Load cells are employed extensively in weighing scales because of their accuracy in measuring weights. Such load cells, or transducers, may have a metallic body having generally rectangular faces. Opposing surfaces of the load cell may carry surface-mounted, resistor strain gauges, interconnected to form an electrical bridge. The central portion of the body may have a rigidly-designed opening beneath the strain gauges to define a desired bending curve in the body of the load cell. The body of the load cell is adapted and disposed to provide cantilevered support for the weighing platform. Thus, when a weight is applied to the weighing platform, temporary deformations in the load cell body are translated into electrical signals that are accurately and reproducibly responsive to the weight. When the weight on the platform is removed, the metallic load cell body is designed to return to an original, unstressed condition.

Planar load cells are known in the art, being disclosed, for example, in U.S. Pat. No. 5,510,581, which patent is incorporated by reference for all purposes as if fully set forth herein. Planar-type load cells may have characteristically low amplitude signals. Parasitic noise may also be a major concern. For these and other reasons, high accuracy weight measurement may pose a considerable challenge.

The inventor has identified various deficiencies in planar load cell assemblies. These include deficiencies in weighing accuracy and sensitivity to off-center loading.

SUMMARY

According to aspects of the present invention there is provided an assembly including a load cell body having contiguous cutout windows, each formed by a pair of cutout lines and connected by a cutout base, the second window being transversely bounded by the first window, the third window being transversely bounded by the second window; measuring beams, disposed along edges of the body, each defined by a respective line of the first pair of cutout lines; first and second arrangements, each having a pair of flexure beams connected by first and second bases, respectively; a loading element, extending from the second base; and strain gages, attached to the beams.

According to aspects of the present invention there is provided a planar load cell assembly comprising: at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed perpendicular to the primary axis; each load cell arrangement including: (a) a first contiguous cutout window passing through the broad dimension and formed by a first pair of cutout lines disposed parallel or generally parallel to the central longitudinal axis, and connected by a first cutout base; (b) a second contiguous cutout window passing through the broad dimension and formed by a second pair of cutout lines disposed parallel or generally parallel to the central longitudinal axis, and connected by a second cutout base; wherein the second contiguous cutout window is transversely bounded by the first contiguous cutout window; (c) a pair of measuring beams, disposed along opposite edges of the load cell body, and parallel or generally parallel to the central longitudinal axis, each of the measuring beams longitudinally defined by a respective cutout line of the first pair of cutout lines; (d) a first flexure arrangement having a first pair of flexure beams, disposed along opposite sides of the central longitudinal axis, and parallel or generally parallel thereto, the first pair of flexure beams longitudinally disposed between the first pair of cutout lines and the second pair of cutout lines, and mechanically connected by a first flexure base; (e) a loading element, longitudinally defined by an innermost pair of cutout lines, and extending from an innermost flexure base, the transverse axis passing through the loading element; and (f) at least one strain gage, fixedly attached to a surface of a measuring beam of the measuring beams.

According to still further features in the described preferred embodiments, each load cell arrangement additionally includes: (g) a third contiguous cutout window passing through the broad dimension and formed by a third pair of cutout lines disposed parallel or generally parallel to the central longitudinal axis, and connected by a third cutout base, the third contiguous cutout window being transversely bounded by the second contiguous cutout window; and (h) a second flexure arrangement having a second pair of flexure beams, disposed along opposite sides of the central longitudinal axis, and parallel or generally parallel thereto, the second pair of flexure beams longitudinally disposed between the second pair of cutout lines and the third pair of cutout lines, and mechanically connected by a second flexure base.

According to still further features in the described preferred embodiments, the loading element, the second pair of flexure beams, the first pair of flexure beams, and the pair of measuring beams are mechanically disposed in series, such that a load disposed on the loading element acts upon the second pair of flexure beams prior to the first pair of flexure beams, and on the first pair of flexure beams prior to the pair of measuring beams.

According to still further features in the described preferred embodiments, a first measuring beam of the measuring beams, a first flexure beam of the first pair of flexure beams, and a first flexure beam of the second pair of flexure beams are all disposed on a first side of the central longitudinal axis, the first measuring beam having a length ($L_{mb}$) and a width ($W_{mb}$), the first flexure beam of the first pair of flexure beams having a length ($L_{F1}$) and a width ($W_{F1}$), and the first flexure beam of the second pair of flexure beams having a length ($L_{F2}$) and a width ($W_{F2}$); wherein dimensionless ratios $K_{mb}$, $K_{F1}$, and $K_{F2}$ are defined as:

$$K_{mb}=W_{mb}/L_{mb}; K_{F1}=W_{F1}/L_{F1}; \text{ and } K_{F2}=W_{F2}/L_{F2};$$

and wherein at least one of $K_{F1}/K_{mb}$ and $K_{F2}/K_{mb}$ is within a range of 0.75 to 1.25.

According to still further features in the described preferred embodiments, an end of the loading element, distal to the second flexure base, is unrestrained.

According to still further features in the described preferred embodiments, the first and second flexure arrangements are adapted to exhibit flexural behavior along both directions of the primary axis.

According to still further features in the described preferred embodiments, D3 is a length of the second flexure base, D3 being defined as a minimum distance, parallel to the central longitudinal axis, between the second cutout base and the third pair of cutout lines; L3 is a length of the loading element parallel to the central longitudinal axis, between the third cutout window and a distal end of the third pair of cutout lines; and a ratio of L3/D3 is within a range of 3 to 7.

According to aspects of the present invention there is provided a planar load cell assembly including at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed along or perpendicular to the primary axis, the load cell body having rectangular faces; each load cell arrangement including: (a) a first contiguous cutout window passing through the broad dimension and formed by a first pair of cutout lines disposed parallel or generally parallel to the central longitudinal axis, and connected by a first cutout base; (b) a second contiguous cutout window passing through the broad dimension and formed by a second pair of cutout lines disposed parallel to the central longitudinal axis, and connected by a second cutout base; and (c) a third contiguous cutout window passing through the broad dimension and formed by a third pair of cutout lines disposed parallel to the central longitudinal axis, and connected by a third cutout base; wherein the second contiguous cutout window is transversely bounded by the first contiguous cutout window, and the third contiguous cutout window is transversely bounded by the second contiguous cutout window; and wherein the second cutout base is disposed diametrically opposite both the first cutout base and the third cutout base; (d) a pair of measuring beams, disposed along opposite edges of the load cell body, and parallel to the central longitudinal axis, each of the measuring beams longitudinally defined by a respective cutout line of the first pair of cutout lines; (e) a first flexure arrangement having a first pair of flexure beams, disposed along opposite sides of the central longitudinal axis, and parallel thereto, the first pair of flexure beams longitudinally disposed between the first pair of cutout lines and the second pair of cutout lines, and mechanically connected by a first flexure base; (f) a second flexure arrangement having a second pair of flexure beams, disposed along opposite sides of the central longitudinal axis, and parallel thereto, the second pair of flexure beams longitudinally disposed between the second pair of cutout lines and the third pair of cutout lines, and mechanically connected by a second flexure base; (g) a loading element, longitudinally defined by the third pair of cutout lines, and extending from the second flexure base, the transverse axis passing through the loading element; and (h) at least one strain gage, fixedly attached to a surface of a measuring beam of the measuring beams.

According to aspects of the present invention there is provided a planar load cell assembly comprising: at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed perpendicular to the primary axis; each load cell arrangement including: (a) a first contiguous cutout window passing through the broad dimension and formed by a first pair of cutout lines disposed parallel to the central longitudinal axis, and connected by a first cutout base; (b) a second contiguous cutout window passing through the broad dimension and formed by a second pair of cutout lines disposed parallel to the central longitudinal axis, and connected by a second cutout base; wherein the second contiguous cutout window is transversely bounded by the first contiguous cutout window; (c) a pair of measuring beams, disposed along opposite edges of the load cell body, and parallel to the central longitudinal axis, each of the measuring beams longitudinally defined by a respective cutout line of the first pair of cutout lines; (d) a first flexure arrangement having a first pair of flexure beams, disposed along opposite sides of the central longitudinal axis, and parallel thereto, the first pair of flexure beams longitudinally disposed between the first pair of cutout lines and the second pair of cutout lines, and mechanically connected by a first flexure base; (e) a loading element, longitudinally defined by an innermost pair of cutout lines, and extending from an innermost flexure base, the transverse axis passing through the loading element; and (f) at least one strain gage, fixedly attached to a surface of a measuring beam of the measuring beams.

According to aspects of the present invention there is provided a planar load cell assembly comprising: at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed perpendicular to or along the primary axis; each load cell arrangement including: (a) a first contiguous cutout window passing through the broad dimension and formed by a first pair of cutout lines disposed parallel to the central longitudinal axis, and connected by a first cutout base; and (b) a second contiguous cutout window passing through the broad dimension and formed by a second pair of cutout lines disposed parallel to the central longitudinal axis, and connected by a second cutout base; (c) a pair of measuring beams, disposed along opposite edges of the load cell body, and parallel to the central longitudinal axis, each of the measuring beams longitudinally defined by a respective cutout line of the first pair of cutout lines; (d) a first flexure arrangement having a first pair of flexure beams, disposed along opposite sides of the central longitudinal axis, and parallel thereto, the first pair of flexure beams longitudinally disposed between the first pair of cutout lines and the second pair of cutout lines, and mechanically connected by a first flexure base; (e) a loading element, longitudinally defined by the third pair of cutout lines, the transverse axis passing through the loading element; and (f) at least one strain gage, fixedly attached to a surface of a measuring beam of the measuring beams.

According to features in the described preferred embodiments, the second contiguous cutout window is transversely bounded by the first contiguous cutout window.

According to features in the described preferred embodiments, the load cell body has rectangular or generally rectangular faces.

According to further features in the described preferred embodiments, the load cell assembly further comprises at least two, or a pair of slots, disposed on the loading element.

According to further features in the described preferred embodiments, the load cell assembly further comprises at least two, or a pair of curved or rounded slots, disposed on the loading element.

According to further features in the described preferred embodiments, the slots or curved slots have a pair of arms.

According to further features in the described preferred embodiments, the slots or curved slots have a pair of arms, wherein the slots are disposed such that the arms of the slots face each other.

According to further features in the described preferred embodiments, the slots or rounded slots are shaped and disposed so as to form, together, a detached or discontinuous, generally rounded, oval, or circular slot or slot structure.

According to further features in the described preferred embodiments, the metal load cell body is made of a magnesium alloy.

According to still further features in the described preferred embodiments, the magnesium alloy contains at least 85% magnesium, by weight or by volume.

According to still further features in the described preferred embodiments, the magnesium alloy contains at least 92% magnesium, by weight or by volume.

According to still further features in the described preferred embodiments, the magnesium alloy contains at least 95% magnesium, by weight or by volume.

According to still further features in the described preferred embodiments, the magnesium alloy contains at least 98% magnesium, by weight or by volume.

According to still further features in the described preferred embodiments, a magnesium content of the magnesium alloy, by weight or by volume, is within a range of 85% to 98%, 88% to 98%, 90% to 98%, or 92% to 98%.

According to still further features in the described preferred embodiments, the magnesium alloy is selected or adapted such that an elastic module (E) thereof is lower than that of aluminum or aluminum alloys such as aluminum alloy 2023 and/or other load-cell grade aluminum alloys.

According to still further features in the described preferred embodiments, the loading element, the second pair of flexure beams, the first pair of flexure beams, and the pair of measuring beams are mechanically disposed in series, such that a load disposed on the loading element acts upon the second pair of flexure beams prior to the first pair of flexure beams, and on the first pair of flexure beams prior to the pair of measuring beams.

According to still further features in the described preferred embodiments, the first measuring beam of the measuring beams, a first flexure beam of the first pair of flexure beams, and a first flexure beam of the second pair of flexure beams are all disposed on a first side of the central longitudinal axis, the first measuring beam having a length ($L_{mb}$) and a width ($W_{mb}$), the first flexure beam of the first pair of flexure beams having a length ($L_{F1}$) and a width ($W_{F1}$), and the first flexure beam of the second pair of flexure beams having a length ($L_{F2}$) and a width ($W_{F2}$); wherein dimensionless ratios $K_{mb}$, $K_{F1}$, and $K_{F2}$ are defined as:

$$K_{mb}=W_{mb}/L_{mb}; K_{F1}=W_{F1}/L_{F1}; \text{ and } K_{F2}=W_{F2}/L_{F2};$$

and wherein at least one of $K_{F1}/K_{mb}$ and $K_{F2}/K_{mb}$ is within a range of 0.75 to 1.25, 0.8 to 1.2, 0.85 to 1.15, 0.9 to 1.1, or 0.92 to 1.08.

According to still further features in the described preferred embodiments, the loading element has a hole for receiving or supporting a load.

According to still further features in the described preferred embodiments, the hole is an elongate hole having a long dimension disposed along the central longitudinal axis.

According to still further features in the described preferred embodiments, the planar load cell assembly is dimensioned such that a nominal load capacity thereof is within a range of 1 to 500 kg.

According to still further features in the described preferred embodiments, with the planar load cell assembly disposed in an operative or weighing mode, and with a load disposed on the loading element so as to achieve the nominal load capacity, an angle of a top surface of the loading element, with respect to horizontal, is within ±3° or within ±2°.

According to still further features in the described preferred embodiments, the angle of the top surface of the loading element, with respect to horizontal, is within ±3°, within ±2°, within ±1.5°, within ±1°, within ±0.8°, within ±0.5°, within ±0.3°, within ±0.25°, within ±0.20°, within ±0.15°, within ±0.12°, within ±0.10°, within ±0.08°, within ±0.06°, within ±0.05°, within ±0.04°, within ±0.035°, within ±0.030°, within ±0.025°, or within ±0.020°.

According to still further features in the described preferred embodiments, for all loads within the nominal load capacity, at least one of the first pair of flexure beams and the second pair of flexure beams exhibits a higher local stress with respect to a local stress in the measuring beams underneath the strain gage.

According to still further features in the described preferred embodiments, the end of the loading element, distal to the second flexure base, is unrestrained.

According to still further features in the described preferred embodiments, the at least one load cell arrangement includes a pair of load cell arrangements sharing the load cell body, each disposed along different and non-overlapping longitudinal segments of the load cell body.

According to still further features in the described preferred embodiments, the at least one, at least two, at least three, or three of the at least three cutout windows is generally U-shaped or C-shaped.

According to still further features in the described preferred embodiments, the first and second flexure arrangements are adapted to exhibit flexural behavior along both directions of the primary axis.

According to still further features in the described preferred embodiments, at least one of the first flexure beam and the second flexure beam is adapted to exhibit flexural behavior along both directions of the transverse axis.

According to still further features in the described preferred embodiments, the broad dimension has rectangular top and bottom faces, and a uniform thickness.

According to still further features in the described preferred embodiments, D3 is a length of the second flexure base, D3 being defined as a minimum distance, parallel to the central longitudinal axis, between the second cutout base and the third pair of cutout lines; L3 is a length of the loading element parallel to the central longitudinal axis, between the third cutout window and a distal end of the third pair of cutout lines; and a ratio of L3/D3 is within a range of 3 to 7, 3.5 to 6.5, 3.8 to 6, 4 to 5.8, 4.2 to 5.6, 4.4 to 5.4, or 4.6 to 5.2.

According to still further features in the described preferred embodiments, the loading element is adapted to associate with a weighing platform of a weighing scale, the planar load cell assembly further including an anchoring region, adapted to be anchored to a base of the weighing scale.

According to still further features in the described preferred embodiments, the loading element includes a hole for receiving a load-bearing element of the weighing platform.

According to still further features in the described preferred embodiments, the loading element is adapted to associate with a base of a weighing scale, the planar load cell assembly further including an anchoring region, adapted to be anchored to a weighing platform of the weighing scale.

According to still further features in the described preferred embodiments, the loading element includes a hole for receiving a load-bearing element of the base.

According to still further features in the described preferred embodiments, the planar load cell assembly has two of the load cell arrangements disposed on the single metal load cell body.

According to still further features in the described preferred embodiments, the single metal load cell body has a central transverse axis centrally disposed along the central longitudinal axis, and the load cell arrangements are disposed about the central longitudinal axis.

According to still further features in the described preferred embodiments, the single metal load cell body has a central transverse axis centrally disposed at a longitudinal center of the central longitudinal axis, and the load cell arrangements are symmetrically disposed about this central longitudinal axis.

According to still further features in the described preferred embodiments, there is provided a double-ended load cell assembly having two load cell arrangements disposed on a single metal load cell body, each of the load cell arrangements being in accordance any of the load cells or load cell features disclosed herein.

According to still further features in the described preferred embodiments, the metal load cell body is made of a magnesium alloy, wherein a magnesium content of the magnesium alloy, by weight or by volume, is within a range of 85% to 98%.

According to still further features in the described preferred embodiments, the magnesium alloy is selected or adapted such that an elastic module (E) thereof is lower than that of load-cell grade aluminum alloy 2023.

According to still further features in the described preferred embodiments, the loading element has a hole for receiving or supporting a load.

According to still further features in the described preferred embodiments, the hole is an elongate hole having a long dimension disposed along the central longitudinal axis.

According to still further features in the described preferred embodiments, the planar load cell assembly is dimensioned such that a nominal load capacity is within a range of 1 to 500 kg.

According to still further features in the described preferred embodiments, with the planar load cell assembly disposed in an operative or weighing mode, and with a load disposed on the loading element so as to achieve the nominal load capacity, an angle of a top surface of the loading element, with respect to horizontal, is within ±3°.

According to still further features in the described preferred embodiments, the first pair of flexure beams exhibits a higher local stress with respect to a local stress in the measuring beams underneath the strain gage when the planar load cell assembly, is within the nominal load capacity.

According to still further features in the described preferred embodiments, the at least one load cell arrangement includes a pair of the load cell arrangements sharing the load cell body, wherein each of the pair is disposed along different and non-overlapping longitudinal segments of the load cell body.

According to still further features in the described preferred embodiments, the first and second cutout windows are generally U-shaped or C-shaped.

According to still further features in the described preferred embodiments, the broad dimension has rectangular top and bottom faces, and a uniform thickness.

According to still further features in the described preferred embodiments, the planar load cell assembly has two of the load cell arrangements disposed on the single metal load cell body, the single metal load cell body has a central transverse axis centrally disposed along a longitudinal center of the central longitudinal axis, and the load cell arrangements are disposed about the central longitudinal axis.

According to still further features in the described preferred embodiments, the planar load cell assembly has two of the load cell arrangements disposed on the single metal load cell body, the single metal load cell body has a central transverse axis centrally disposed along the central longitudinal axis, and the load cell arrangements are symmetrically disposed about the central longitudinal axis.

According to still further features in the described preferred embodiments, (i) the loading element is adapted to associate with one of a weighing platform of a weighing scale and a base of a weight scale, (ii) the planar load cell assembly further includes an anchoring region, (iii) the anchoring region is adapted to be anchored to the base if the loading element is adapted to associate with the weighing platform, and (iv) the anchoring region is adapted to be anchored to the weighing platform if the loading element is adapted to associate with the base.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 7B is an exemplary displacement plot showing a deflection of the flexure arrangement and the load cell arrangement of FIG. 7A, in response to a vertical load;

FIG. 7C is an exemplary displacement plot showing a deflection of the flexure arrangement and the load cell arrangement of FIG. 7A, in response to a moment (Mz) along the transverse (Z) axis;

DESCRIPTION OF THE PREFERRED EMBODIMENTS

Figure 1:
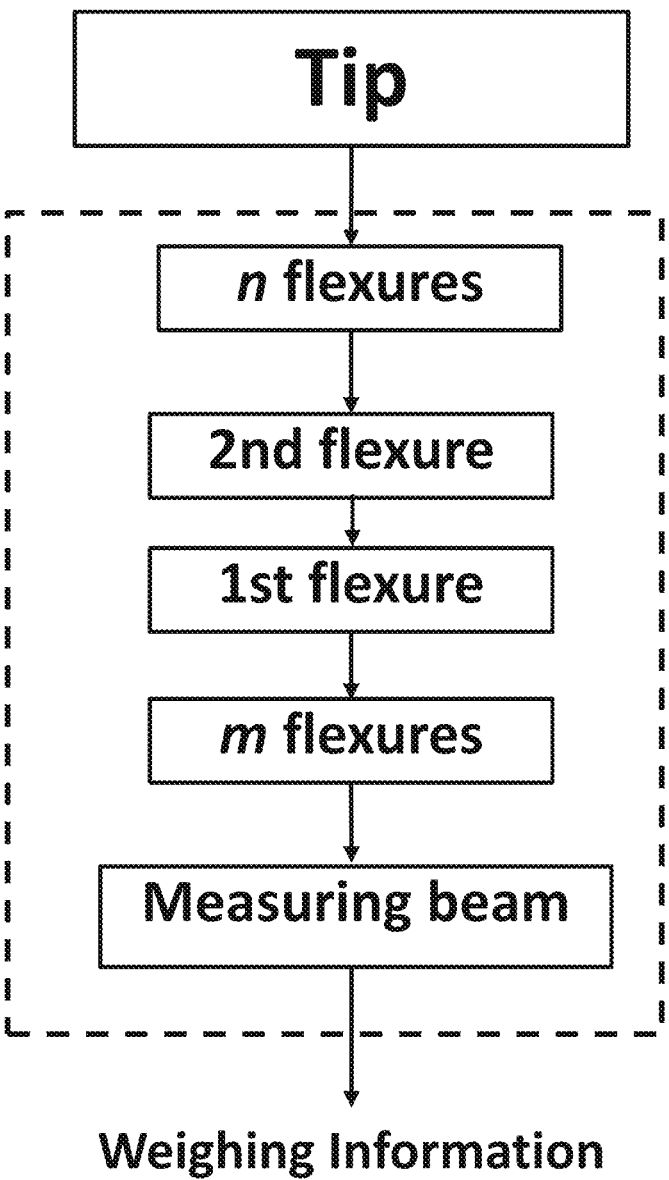
FIG. 1 is a block diagram of showing a series connection between the loaded loading beam and the measuring beam, via a flexure arrangement having at least two flexures, within a spring arrangement of a load cell assembly, according to embodiments of the present invention.

The principles and operation of the low-profile or planar load cell assembly according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Load cells with low profiles may have a characteristically low amplitude signal. Given limitations in the total weight to be measured, and the inherent sensitivity of load cells, the performance of such devices may be compromised by a high noise-to-signal ratio and by unacceptable settling times. Various embodiments of the present invention resolve, or at least appreciably reduce, parasitic noise issues associated with typical low-profile load cells and enable high accuracy weight measurements.

FIG. 1 is a block diagram schematically showing the operation of a spring arrangement, in loaded or operative mode, according to aspects of the present invention. Loading of the spring arrangement is effected by placing a load on, or below, the loading beam, depending on whether the loading beam is anchored to the weighing platform, or to the weighing base. The loading beam may also be referred to as the "loading element" or as the "load-receiving element" or "load-supporting element" (depending on the configuration) of the load cell assembly. The spring arrangement has at least one flexure arrangement having at least two flexures or flexural elements operatively connected in series. The flexure arrangement is operatively connected, at a first end, to the loading beam, and at a second end, to the free or adaptive end of at least one measuring beam.

Substantially as shown, the flexure arrangement has n flexures (n being an integer) operatively connected in series, the first of these flexures being operatively connected to the loading beam, and the ultimate flexure of the n flexures being operatively connected in series to a second flexure, which in turn, is operatively connected to the first flexure in an assembly of m flexures (m being an integer), operatively connected in series. The ultimate flexure of the m flexures is operatively connected, in series, to a measuring beam of the spring arrangement. Associated with the measuring beam is at least one strain gage, which produces weighing information with respect to the load.

The inventor has discovered that at least two of such flexure arrangements, disposed in parallel, may be necessary for the loading element to be suitably disposed substantially in a horizontal position (i.e., perpendicular to the load). In some embodiments, and particularly when extremely high accuracy is not necessary, a single flexure disposed between the loading beam and the measuring beam may be sufficient. This single flexure load cell arrangement may also exhibit increased crosstalk with other load cell arrangements (weighing assemblies may typically have 4 of such load cell arrangements for a single weighing platform). For a given nominal capacity, the overload capacity may also be compromised with respect to load cell arrangements having a plurality of flexures disposed in series between the load receiving beam and the measuring beam. This reduced overload capacity may be manifested as poorer durability and/or shorter product lifetime, with respect to load cell arrangements having a plurality of flexures disposed in series. Nonetheless, the overall performance of the single-flexure arrangement may compare favorably with conventional weighing apparatus and load cell arrangements. In any event, for this case, m+n=−1, which is the lowest value of m+n flexures for the present invention.

Figure 2:
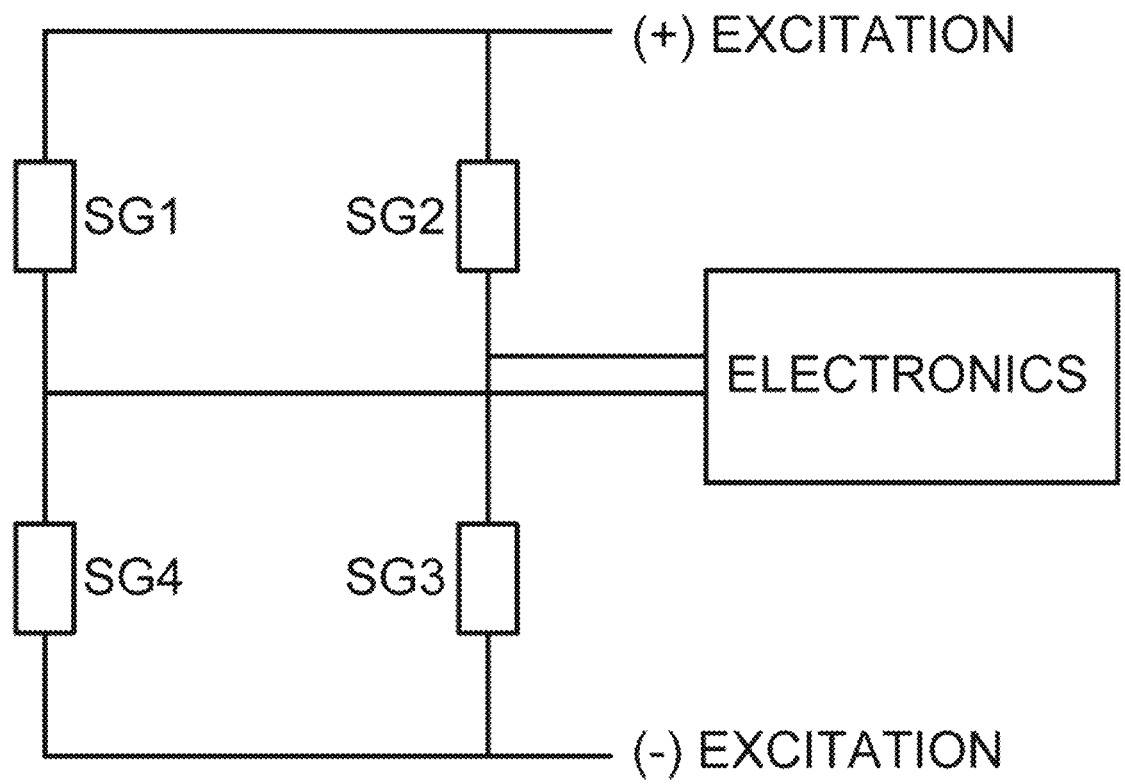
FIG. 2 is a conventional schematic diagram of the strain gage electronics.

Typically, there are 4 strain gages per loading beam. FIG. 2 provides a conventional schematic diagram of the strain gage electronics, which may be used in, or with, the load cell assemblies and weighing modules of the present invention. The strain gages may be configured in a Wheatstone bridge configuration, a configuration that is well known to those of skill in the art. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

Figures 3A, 3B:
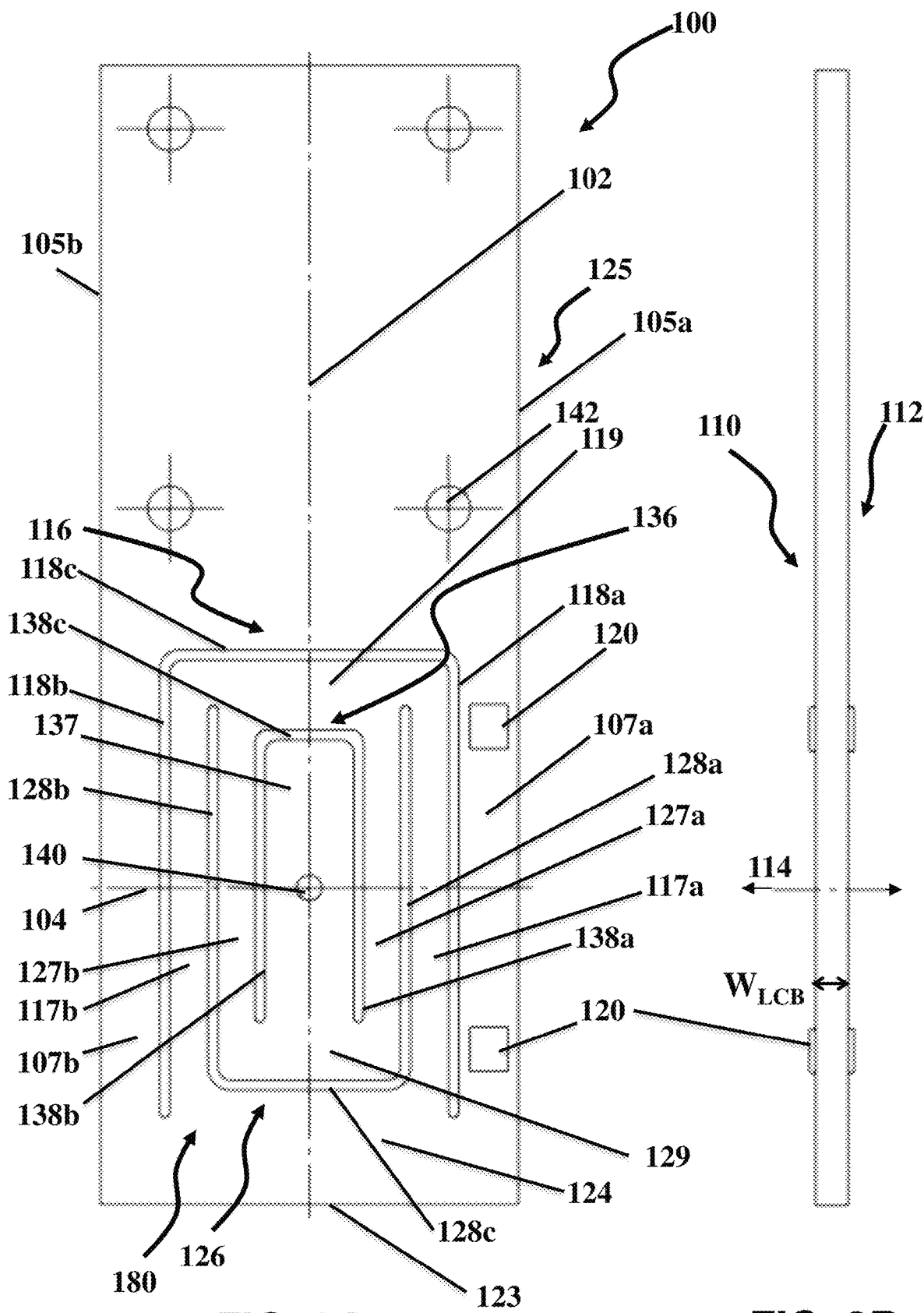
FIG. 3A is a top, schematic view of a planar load cell assembly, according to embodiments of the present invention.
FIG. 3B is a side, schematic view of the planar load cell assembly of FIG. 1A.

With reference now to the FIGS. 3A and 3B, FIG. 3A is a top, schematic view of a planar load cell assembly 100, according to an embodiment of the present invention; FIG. 3B is a side, schematic view of the planar load cell assembly of FIG. 3A.

Referring collectively to FIGS. 3A and 3B, a load cell body 125 may be made from a block of load cell quality metal or alloy. Particularly advantageous embodiments employing particular magnesium alloys will be described hereinbelow.

Load cell body 125 may be fixed to a weighing assembly via one or more mounting holes or elements 142. A $1^{st}$ contiguous cutout window 116 passes from a top face 110 through a bottom face 112, perpendicularly through the broad dimension (i.e., with respect to the other 2 dimensions of a three-dimensional Cartesian system) of load cell body 125. $1^{st}$ contiguous cutout window 116 may be generally C-shaped or U-shaped, and may have arms or a pair of cutout lines 118a, 118b running generally parallel to a central longitudinal axis 102 of load cell body 125, and connected or made contiguous by a cutout line or cutout base 118c. Both central longitudinal axis 102 and a transverse axis 104, disposed transversely thereto, run generally parallel to the broad dimension of load cell body 125. Both of these axes are oriented in perpendicular fashion with respect to a primary axis 114. The thickness of load cell body 125 perpendicular to primary axis 114 is typically within a range of 2 mm to 10 mm, and is designated $W_{LCB}$.

Long sides 105a and 105b of load cell body 125 run generally along, or parallel to, central longitudinal axis 102.

As shown, measuring beams or spring elements 107a and 107b are each disposed between respective cutout lines 118a and 118b, and respective long sides 105a and 105b of load cell body 125, distal to cutout lines 118a and 118b with respect to transverse axis 104. When planar load cell assembly 100 is disposed in a vertically loaded position, the free end of each of beams 107a and 107b may be held in a fixed relationship, substantially perpendicular to the vertical load, by an end block 124 disposed at a free end 123 of load cell body 125.

A $2^{nd}$ contiguous cutout window 126 also passes from top face 110 through bottom face 112, perpendicularly through the broad dimension of load cell body 125. $2^{nd}$ contiguous cutout window 126 may be generally C-shaped or U-shaped, and may have arms or a pair of cutout lines 128a, 128b running generally parallel to central longitudinal axis 102, and connected or made contiguous by a cutout line or cutout base 128c. $2^{nd}$ contiguous cutout window 126 may be enveloped on three sides by $1^{st}$ contiguous cutout window 116 (such that the $2^{nd}$ contiguous cutout window is transversely bounded by the $1^{st}$ contiguous cutout window). The orientation of $2^{nd}$ contiguous cutout window 126 may be 180° (i.e., generally opposite) with respect to $1^{st}$ contiguous cutout window 116.

A $3^{rd}$ contiguous cutout window 136 also passes from top face 110 through bottom face 112, perpendicularly through the broad dimension of load cell body 125. $3^{rd}$ contiguous cutout window 136 may be generally C-shaped or U-shaped, and may have arms or a pair of cutout lines 138a, 138b running generally parallel to central longitudinal axis 102, and connected or made contiguous by a cutout line or cutout base 138c. $3^{rd}$ contiguous cutout window 136 may be enveloped on three sides by $2^{nd}$ contiguous cutout window 126 (such that the $3^{rd}$ contiguous cutout window is transversely bounded by the $2^{nd}$ contiguous cutout window). The orientation of $3^{rd}$ contiguous cutout window 136 may be 180° (i.e., generally opposite) with respect to $2^{nd}$ contiguous cutout window 126 (and generally aligned with $1^{st}$ contiguous cutout window 116).

Load cell body 125 has a first flexure arrangement having a first pair of flexure beams 117a, 117b disposed along opposite sides of central longitudinal axis 102, and distal and parallel thereto. First pair of flexure beams 117a, 117b may be longitudinally disposed between the first pair of cutout lines and the second pair of cutout lines, and mechanically connected or coupled by a first flexure base 119.

Load cell body 125 has a second flexure arrangement having a second pair of flexure beams 127a, 127b disposed along opposite sides of central longitudinal axis 102, and distal and parallel thereto. Second pair of flexure beams 127a, 127b may be longitudinally disposed between the first pair of cutout lines and the second pair of cutout lines, and mechanically connected or coupled by a second flexure base 129.

Contiguous cutout window 136 defines a loading element 137 disposed therein. Loading element 137 is longitudinally defined by $3^{rd}$ pair of cutout lines 138a and 138b, and is connected to, and extends from, second flexure base 129.

The various cutout lines described above may typically have a width ($W_{CO}$) of 0.2 mm to 5 mm, and more typically, 0.2 mm to 2.5 mm, 0.2 mm to 2.0 mm, 0.2 mm to 1.5 mm, 0.2 mm to 1.0 mm, 0.2 mm to 0.7 mm, 0.2 mm to 0.5 mm, 0.3 mm to 5 mm, 0.3 mm to 2.5 mm, 0.3 mm to 2.0 mm, 0.3 mm to 1.5 mm, 0.3 mm to 1.0 mm, 0.3 mm to 0.7 mm, 0.3 mm to 0.6 mm, or 0.3 mm to 0.5 mm.

In some embodiments, the ratio of $W_{CO}$ to $W_{LCB}$ ($W_{CO}/W_{LCB}$) is at most 0.5, at most 0.4, at most 0.3, at most 0.25, at most 0.2, at most 0.15, at most 0.12, at most 0.10, at most 0.08, at most 0.06, or at most 0.05.

In some embodiments, the ratio of $W_{CO}$ to $W_{LCB}$ ($W_{CO}/W_{LCB}$) is within a range of 0.03 to 0.5, 0.03 to 0.4, 0.03 to 0.3, 0.03 to 0.2, 0.03 to 0.15, 0.03 to 0.10, 0.04 to 0.5, 0.04 to 0.4, 0.04 to 0.3, 0.04 to 0.2, 0.04 to 0.15, 0.04 to 0.10, 0.05 to 0.5, 0.05 to 0.4, 0.05 to 0.3, 0.05 to 0.2, 0.05 to 0.15, or 0.05 to 0.10. Loading element 137 may also include a hole 140, which may be a threaded hole, for receiving a load, e.g., for receiving or connecting to an upper, weighing platform, or for supporting a load, e.g., connecting to a base, leg, or support (disposed below load cell body 125) of a weighing system (described with respect to FIG. 11). Load-receiving hole 140 may be positioned at an intersection of central longitudinal axis 102 and transverse axis 104.

In the exemplary embodiment provided in FIGS. 3A and 3B, first and second flexure arrangements form a flexure arrangement 180, mechanically disposed between loading element 137 and measuring beams or spring elements 107a and 107b.

Figure 4:
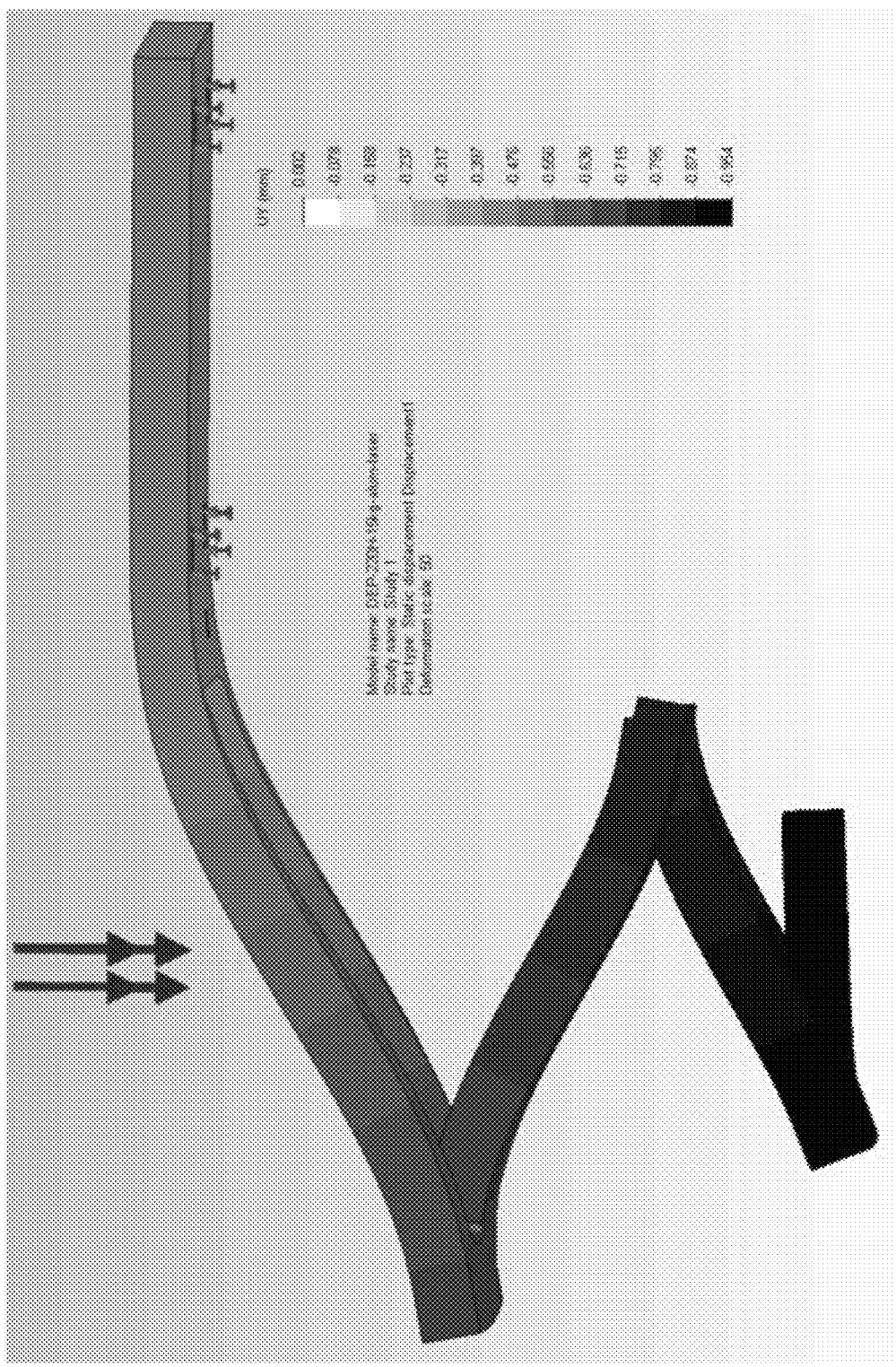
FIG. 4 is an exemplary displacement plot showing a deflection of a flexure and load cell arrangement similar to that of FIG. 3A, in response to a vertical load, according to embodiments of the present invention.

At least one strain gage, such as strain (or "strain-sensing") gages 120, may be fixedly attached to a surface (typically a top or bottom surface) of each of measuring beams 107a and 107b. Strain gages 120 may be adapted and positioned to measure the strains caused by a force applied to the top of the "free" or "adaptive" side 123 of load cell body 125. When a vertical load acts on free end (i.e., an end unsupported by the base, as shown in FIG. 4) 123 of load cell body 125, load cell body 125 undergoes a slight deflection or distortion, with the bending beams assuming a double-bending configuration having an at least partial, and typically primarily or substantially, double-bending behavior. The distortion is measurably sensed by strain gages 120.

It may thus be seen that planar load cell assembly 100 is a particular case of a load cell assembly having the load beam and spring arrangement of FIG. 1. In this case, the number of intermediate flexures is 2, such that m and n both equal zero. In addition, the intermediate flexures are intermediate flexure beam pairs connected by a flexure base. Similarly, the measuring beams are connected at a first end by the fixed end of load cell body 125, and at the opposite end by adaptive end 124 of load cell body 125.

A load cell body 125 may be made from a block of load cell quality metal or alloy. For example, load cell quality aluminum is one conventional and suitable material. In some embodiments, the alloy may advantageously be a magnesium alloy, typically containing at least 85%, at least 90%, and in some cases, at least 92%, at least 95%, or at least 98% magnesium, by weight or by volume. The magnesium alloy should preferably be selected to have an elastic module (E) that is lower, and preferably significantly lower, than that of aluminum.

FIG. 4 is an exemplary displacement plot showing a deflection of the flexure arrangements and measuring beams, according to embodiments of the present invention. The flexure arrangements and measuring beams of the planar load cell assembly should be dimensioned and structured such that under loading in an operative mode, the broad face of loading element 137 is close to 90° (within ±5° within ±3°, or within ±2°, within ±1.5°, within ±1.0°, within ±0.5°, within ±0.3°, within ±0.25°, within ±0.20°, within ±0.15°, within ±0.12°, or within ±0.10°, with respect to the vertical or the direction of the load (denoted in FIG. 4 by the 4 arrows pointing down towards the measuring beams of the load cell assembly), at "full capacity" or "nominal capacity" of the load cell. The closer such a configuration is to 90°, the greater the weighing accuracy.

As used herein in the specification and in the claims section that follows, the term "nominal capacity", and the like, as known in the art, is the load that effects 1 microstrain (0.1% of the strain) in the length of the measuring beam.

Alternatively, with the low-profile load cell assembly disposed in an operative or weighing mode, and with a load disposed on the loading element so as to achieve the nominal load capacity, an angle of a top surface of the loading element, with respect to horizontal, is within ±3°, within ±2°, within ±1.5°, within ±1°, within ±0.8°, within ±0.5°, within ±0.3°, within ±0.25°, within ±0.20°, within ±0.15°, within ±0.12°, within ±0.10°, within ±0.08°, within ±0.06°, within ±0.05°, within ±0.04°, within ±0.035°, within ±0.030°, within ±0.025°, or within ±0.020°.

Figure 5A:
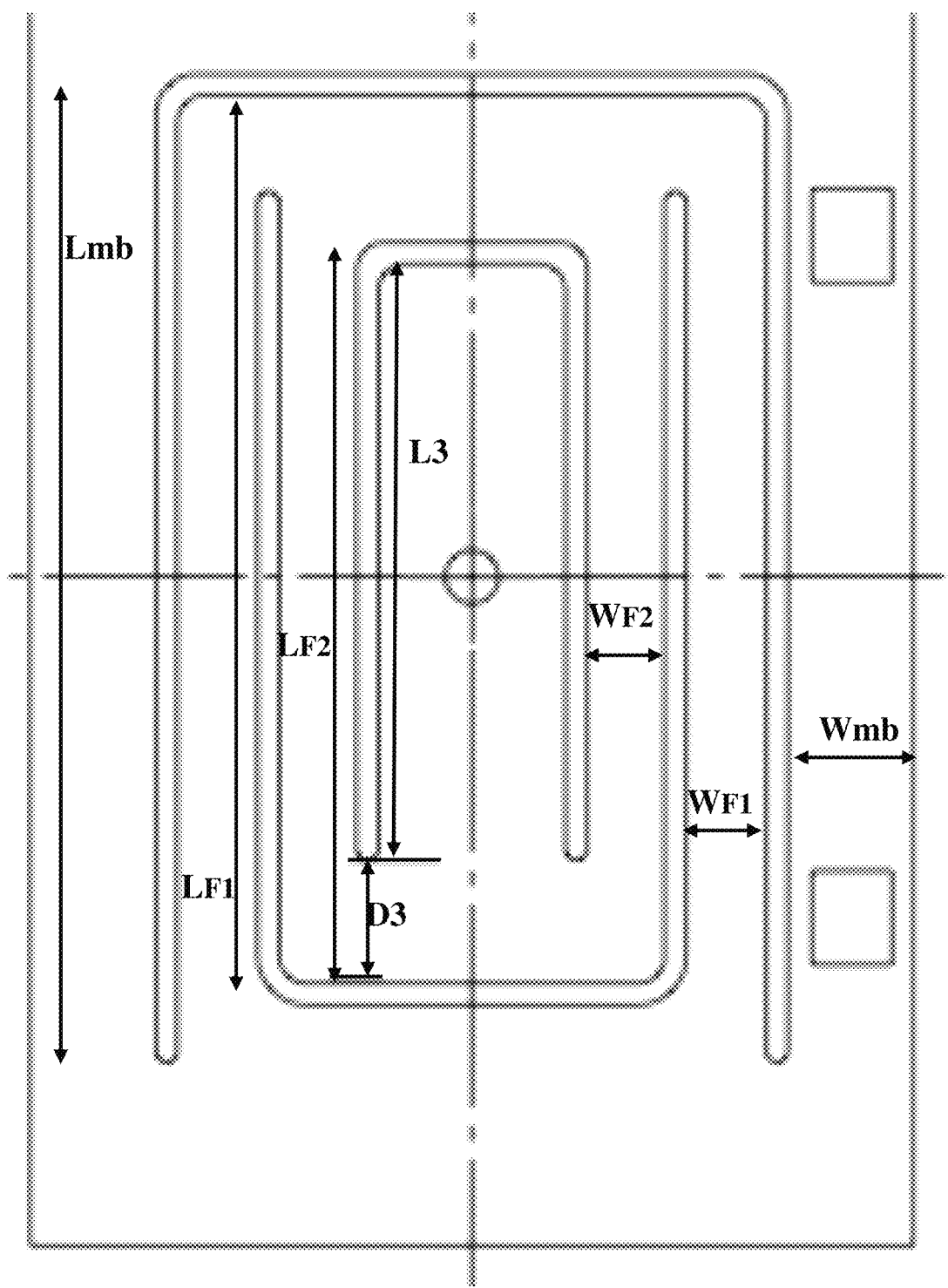
FIG. 5A is a partial, schematic view of the planar load cell assembly of FIG. 3A.

FIG. 5A is a partial, schematic view of the planar load cell assembly of FIG. 3A, in which the lengths and widths of measuring beams 107 a-b ($L_{mb}$, $W_{mb}$) are defined. Similarly, the lengths and widths of the first pair of flexure beams 117a, 117b ($L_{F1}$, $W_{F1}$) and the second pair of flexure beams 127a, 127b ($L_{F2}$, $W_{F2}$) are defined.

For these variables, a set of dimensionless ratios $K_{mb}$, $K_{F1}$, and $K_{F2}$ are defined as:

$$K_{mb}=W_{mb}/L_{mb}; K_{F1}=W_{F1}/L_{F1}; \text{ and } K_{F2}=W_{F2}/L_{F2};$$

Typically, at least one or both of $K_{F1}/K_{mb}$ and $K_{F2}/K_{mb}$ are within a range of 0.75 to 1.25, 0.8 to 1.2, 0.85 to 1.15, 0.9 to 1.1, or 0.92 to 1.08.

In FIG. 5A, a length D3 of second flexure base 129, as shown, is defined as the minimum distance, parallel to central longitudinal axis 102, between cutout base 128c of $2^{nd}$ contiguous cutout window 126 and cutout lines 138a, 138b of $3^{rd}$ contiguous cutout window 126 (all shown in FIG. 3A). Also defined is a length L3, which as shown, is the length of loading element 137 parallel to central longitudinal axis 102 (ending at the end of cutout lines 138a or 138b juxtaposed with second flexure base 129).

The inventor has discovered that in various embodiments of the present invention, and optionally, to achieve improved weighing accuracy, the ratio L3/D3 is preferably within a range of 3 to 7 or 3.5 to 6.5, and more typically, within a range of 3.8 to 6, 4 to 5.8, 4.2 to 5.6, 4.4 to 5.4, or 4.6 to 5.2.

Figure 5B:
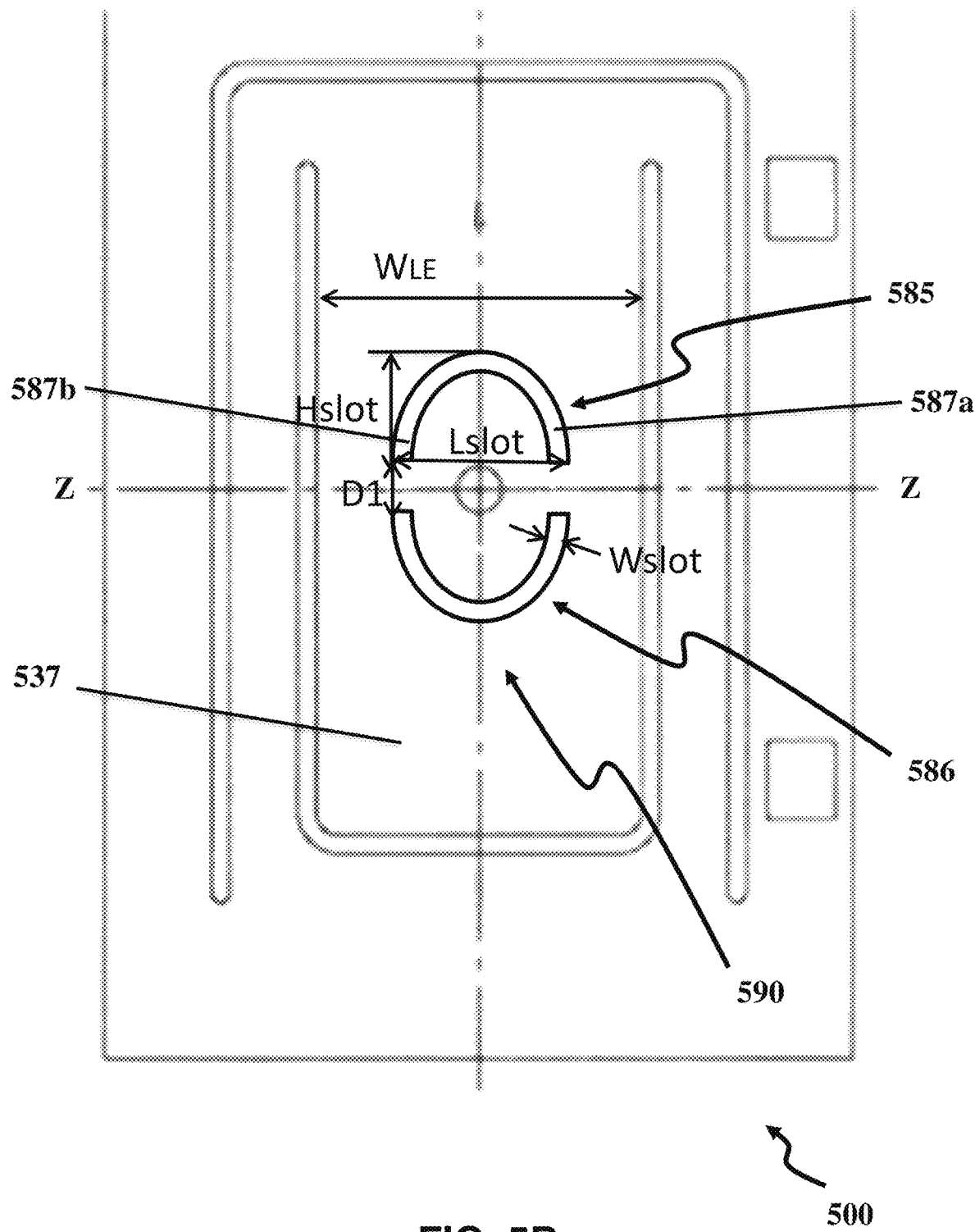
FIG. 5B is a partial, top schematic view of a planar load cell assembly similar to that of FIG. 3A, and having a pair of slots disposed on the loading element.

FIG. 5B is a partial, top schematic view of a planar load cell assembly 500 similar to that of FIG. 3A, and having a pivot structure 590 including a pair of slots such as rounded or curved slots (585, 586) disposed on the loading element 537. The rounded slots may be disposed such that the slot arms (such as 587a, 587b of slot 585) face each other, to form a detached generally rounded, circular or generally oval or ovoid structure. The shortest distance between the slot arms of curved slots 585 and 586 is denoted by D1. The diameter, or largest distance between the slot arms 587a, 587b of an individual curved slot 585 is denoted by Lslot. The height, or largest distance between the slot arms 587a, 587b of an individual curved slot 585 is denoted by Hslot. The width of an individual slot 585 is denoted by Wslot, and may be as narrow as practically possible, typically 0.2-1.0 mm and more typically, 0.2-0.5 mm. The width of the loading element is denoted by $W_{LE}$. Typically, D1 is less than Hslot, Wslot and $W_{LE}$.

Curved slots 585 and 586 may appreciably increase the elasticity of the load cell arrangement, particularly when moments having a significant component parallel to the Z-Z axis (the "transverse axis") are applied. Curved slots 585 and 586 may be somewhat rotated in orientation so as to further increase the elasticity of the load cell arrangement, particularly when moments having a significant component perpendicular to the Z-Z axis (parallel to the central longitudinal axis) are applied.

Figure 5C:
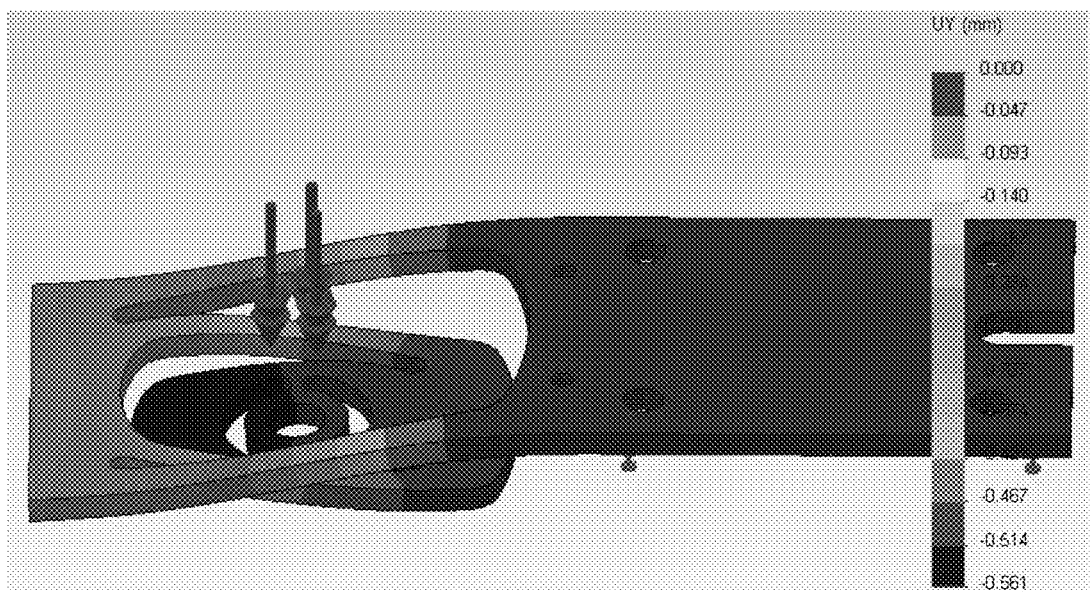
FIG. 5C is an exemplary displacement plot showing a deflection of the flexure arrangement and the load cell arrangement of FIG. 5B, in response to a vertical load.

FIG. 5C is an exemplary displacement plot showing a deflection of the flexure arrangement and the load cell arrangement of FIG. 5B.

Figure 5D:
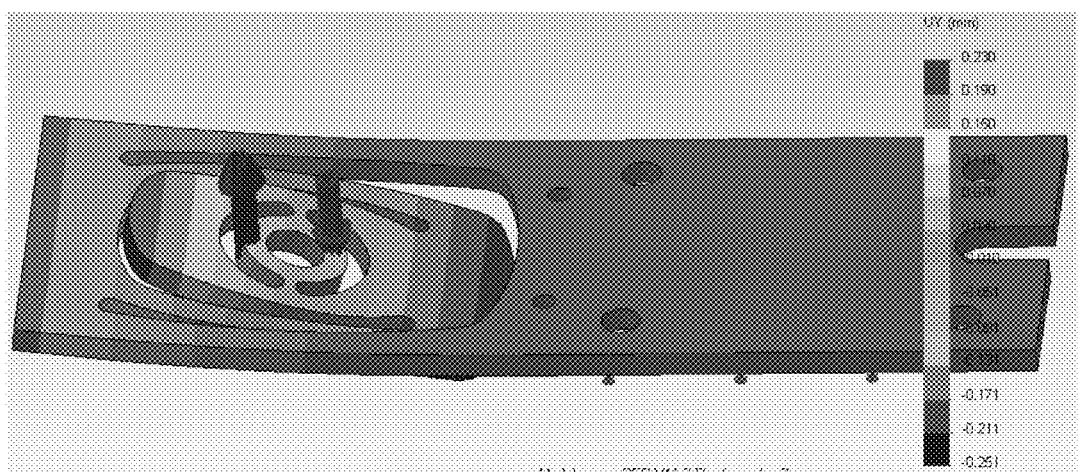
FIG. 5D is an exemplary displacement plot showing a deflection of the flexure arrangement and the load cell arrangement of FIG. 5B, in response to a moment along the transverse (Z) axis.
Figure 5E:
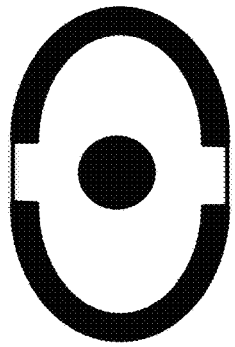
FIG. 5E is an exemplary pivot structure of the flexure arrangement and the load cell arrangement of FIG. 5B.

FIG. 5D is an exemplary displacement plot showing a deflection of the flexure arrangement and the load cell arrangement of FIG. 5B, in response to a moment along the transverse (Z) axis. The arrangement includes an exemplary pivot structure, better viewed in FIG. 5E. Such a pivot structure may provide additional, appreciable flexibility when a moment Mz is applied at or near the transverse Z-Z axis (shown in FIG. 5B). This additional elastic and reversible flexibility may appreciably reduce, or make insignificant, the deleterious effects of such a moment on the measurement beams/strain gages.

Figure 6A:
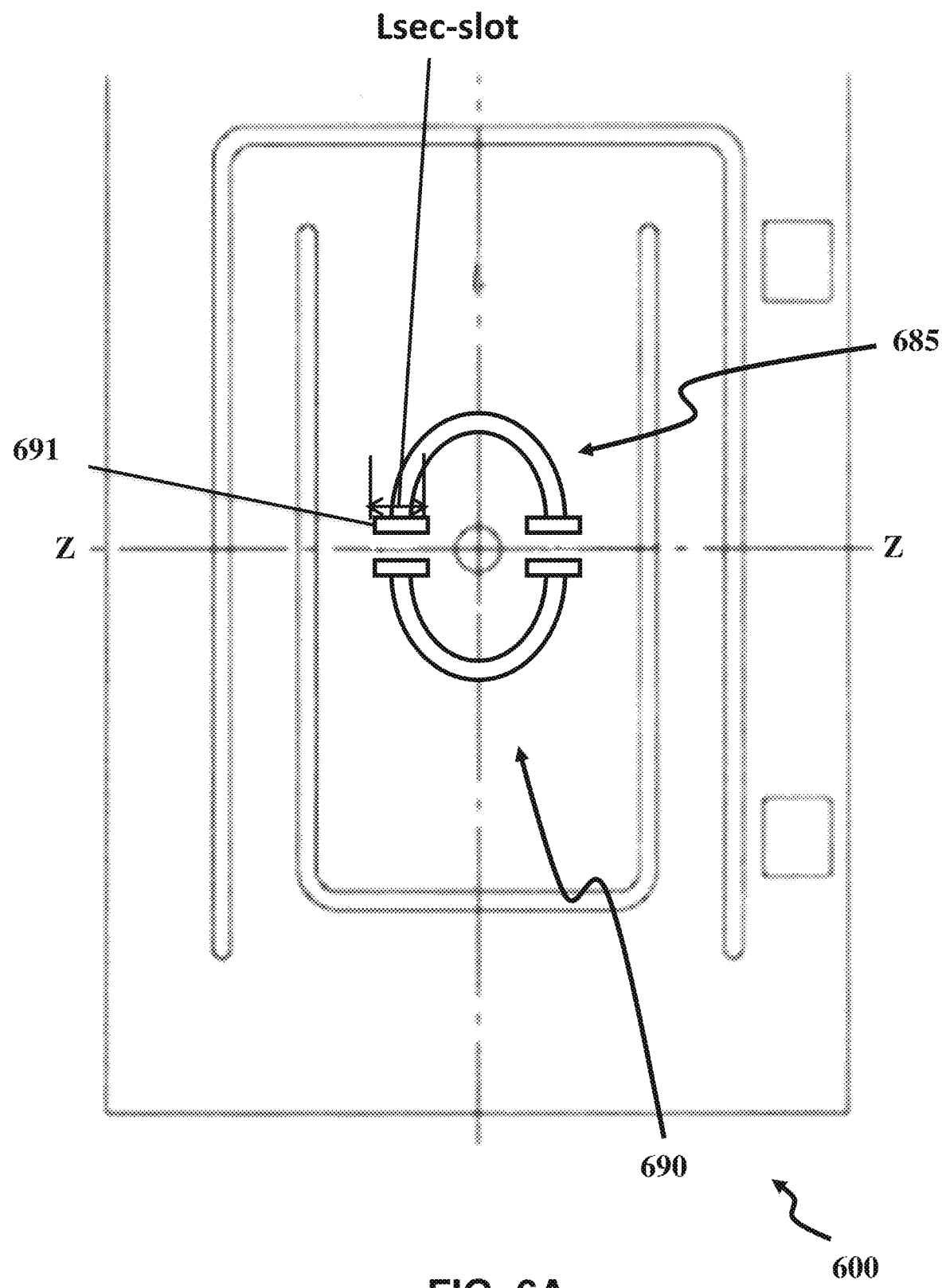
FIG. 6A is a partial, top schematic view of a planar load cell assembly similar to that of FIG. 3A, and having a pair of slots ending in pivot cutout lines disposed on the loading element.
Figure 6B:
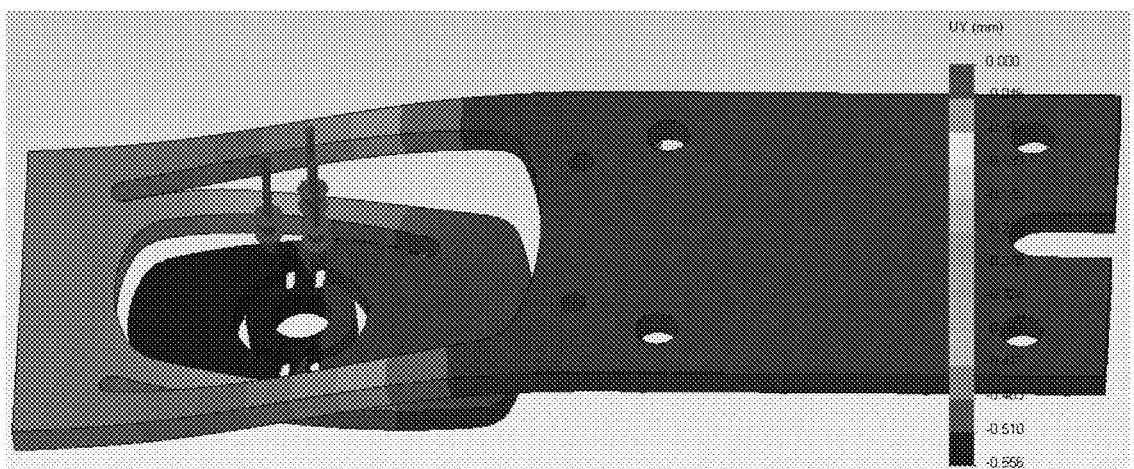
FIG. 6B is an exemplary displacement plot showing a deflection of the flexure arrangement and the load cell arrangement of FIG. 6A, in response to a vertical load.

FIG. 6A is a partial, top schematic view of a planar load cell assembly 600 similar to that of FIGS. 3A and 5B, and having a pivot structure 690 including slots or curved slots (typically a pair of curved slots such as slot 685) whose arms end in pivot cutout lines 691 disposed on the loading element. The length (Lsec-slot) of such pivot cutout lines 691 exceeds the width of the curved slots (Wslot shown in FIG. 5B), e.g., by at least 1 mm, at least 2 mm, at least 3 mm, or at least 4 mm. Typically, Lsec-slot is at most 20 mm, at most 15 mm, at most 10 mm, or at most 8 mm. FIG. 6B is an exemplary displacement plot showing a deflection of the flexure arrangement and the load cell arrangement of FIG. 6A, in response to a vertical load.

Figure 6C:
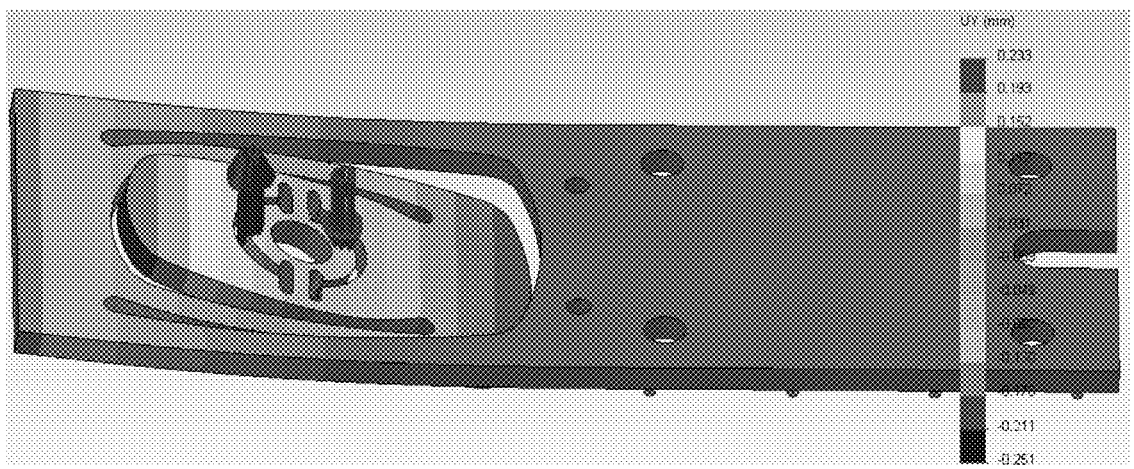
FIG. 6C is an exemplary displacement plot showing a deflection of the flexure arrangement and the load cell arrangement of FIG. 6A, in response to a moment (Mz) along the transverse (Z) axis.

FIG. 6C is an exemplary displacement plot showing a deflection of the flexure arrangement and the load cell arrangement of FIG. 6A, in response to a moment (Mz) along the transverse (Z) axis. The deflection is an elastic deflection. The arrangement includes an exemplary pivot structure, better viewed in FIG. 6D. As described above, such a pivot structure may provide additional, appreciable flexibility when a moment Mz is applied at or near the transverse Z-Z axis. This additional elastic and reversible flexibility may appreciably reduce, or make insignificant, the deleterious effects of such a moment on the measurement beams/strain gages. Moreover, the additional one or more pivot cutout lines 691 in the arrangement of FIGS. 6C-D may provide the pivot structure with appreciably increased flexibility with respect to the pivot structure provided in FIG. 5E.

It will be appreciated that the cutout lines on the pivot structure may be oriented so as to exhibit increased flexibility to moments applied along the longitudinal axis as well.

Figure 6D:
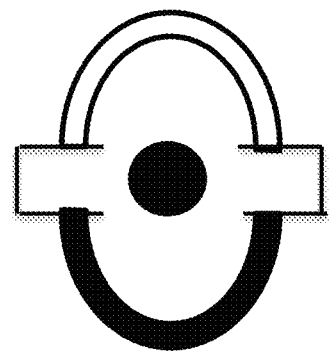
FIG. 6D is an exemplary pivot structure of the flexure arrangement and the load cell arrangement of FIG. 6A.

FIG. 6D is an exemplary pivot structure of the flexure arrangement and the load cell arrangement of FIG. 6A.

Figure 7A:
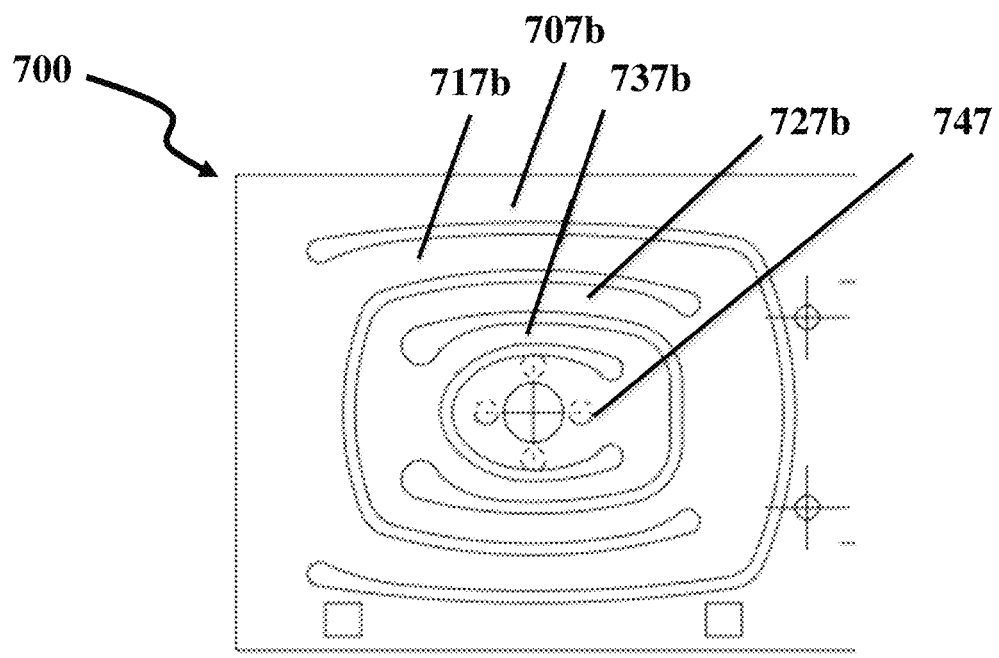
FIG. 7A is a partial, schematic view of a planar load cell assembly having three flexure beams between the loading element and the measuring beam.

FIG. 7A is a partial, schematic view of a planar load cell assembly 700 having three flexure beams 717b, 727b, 737b, disposed in series with respect to the loading element 747 and the measuring beam 707b. In terms of the schematic arrangement shown in FIG. 1, m+n=1.

FIG. 7B is an exemplary displacement plot showing a deflection of the flexure arrangement and the load cell arrangement of FIG. 7A, in response to a vertical load, according to embodiments of the present invention. As described hereinabove, the flexure arrangements and measuring beams of the planar load cell assembly should be dimensioned and structured such that under loading in an operative mode, the broad face of the loading element is close to 90° (within ±5° within ±3°, or within ±2°, within ±1.5°, within ±1.0°, within ±0.5°, within ±0.3°, within ±0.25°, within ±0.20°, within ±0.15°, within ±0.12°, or within ±0.10°, with respect to the vertical or the direction of the load (denoted in FIG. 4 by the 4 arrows pointing down towards the measuring beams of the load cell assembly), at "full capacity" or "nominal capacity" of the load cell. The closer such a configuration is to 90°, the greater the weighing accuracy.

FIG. 7C is an exemplary displacement plot showing a deflection of the flexure arrangement and the load cell arrangement of FIG. 7A, in response to a moment (Mz) along the transverse (Z-Z) axis.

Figures 8A, 8B:
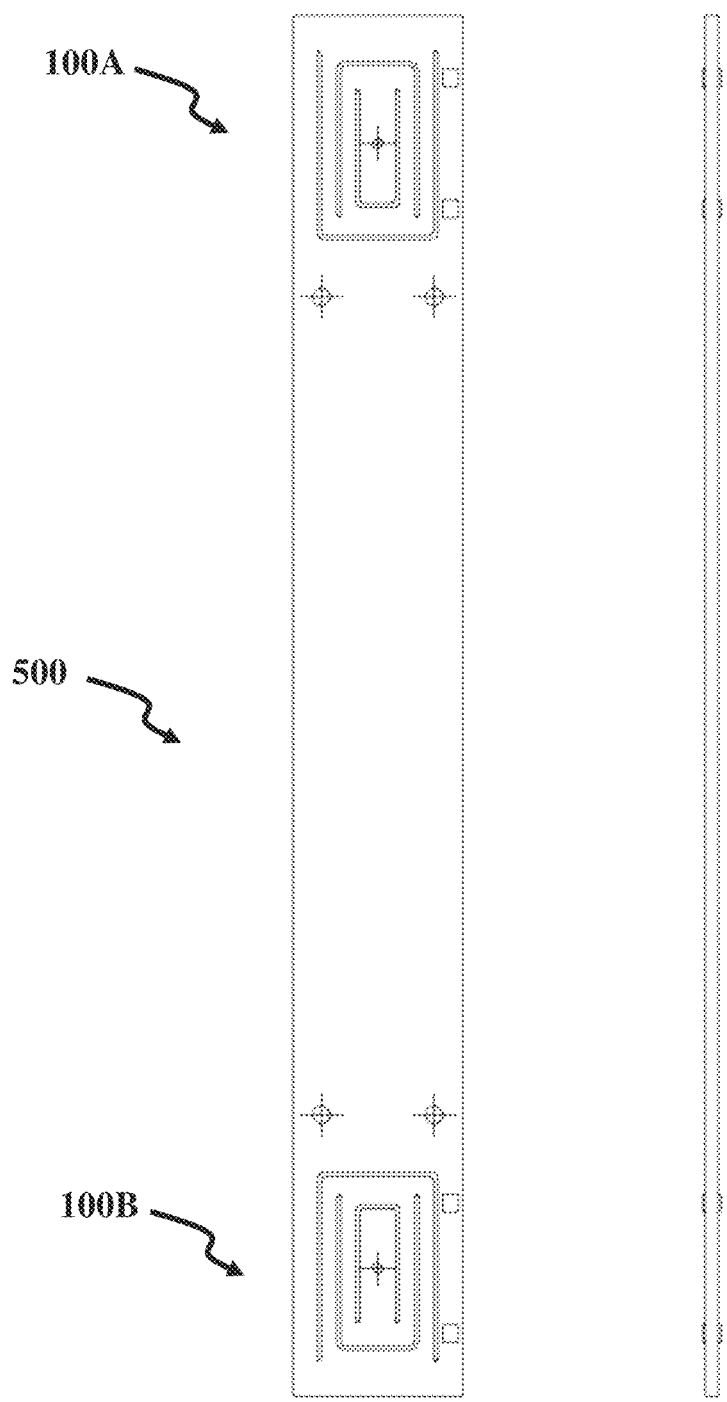
FIGS. 8A and 8B are schematic top and side views of a double-ended planar assembly load cell assembly having two planar load cells sharing a single, integral load cell body.

FIGS. 8A and 8B are schematic top and side views of a double-ended planar load cell assembly 500 having two planar load cell assemblies 100A, 100B, substantially similar or identical to those described hereinabove, but sharing a common, integral load cell body, and generally disposed at opposite ends thereof, optionally symmetrically about a central transverse axis (Z-Z) of the load cell body.

Figure 9:
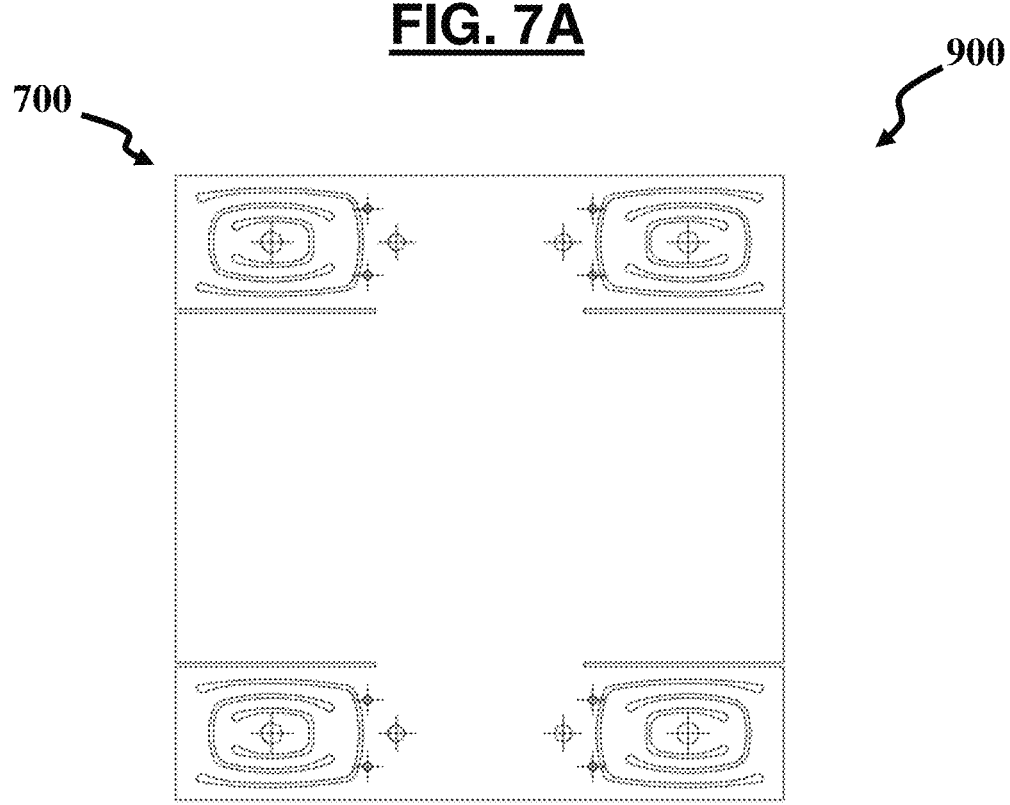
FIG. 9 is a schematic top view of an inventive planar load cell assembly having four planar load cells sharing a single, integral load cell body, each planar load cell assembly having three flexure beams between the loading element and the measuring beam, as in FIG. 7A.

FIG. 9 is a schematic top view of an inventive planar load cell assembly having four planar load cells sharing a single, integral load cell body, each planar load cell assembly having three flexure beams between the loading element and the measuring beam, as in FIG. 7A. Typically, a load cell assembly may employ solely these four planar load cells. Such an arrangement may exhibit appreciably reduced crosstalk between load cells, with respect to 4 individual load cell bodies, or with respect to 2 double-ended planar load cell assemblies.

Figure 10:
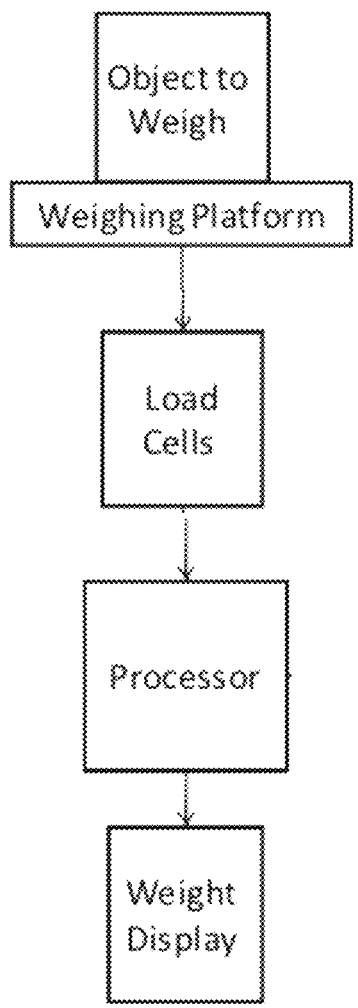
FIG. 10 is a block diagram of a weighing scale or load cell assembly, according to embodiments of the present invention.

FIG. 10 is a block diagram of a weighing scale or load cell assembly. An object to be weighed is placed on the top plate of a weighing scale of the present invention. During operation, vertical forces applied to the top plate are transferred to one or more of the inventive load cell assemblies (e.g., load cell assembly 100) configured to measure vertical forces. Electrical signals containing, or correlated with, weight information, are communicated with a processor. The processor processes the signals, or adaptations thereof, to produce weight information, and may then transmit this weight information, for example, to a display device. A processor port may also be available for maintenance, calibration or firmware updates.

Figure 11:
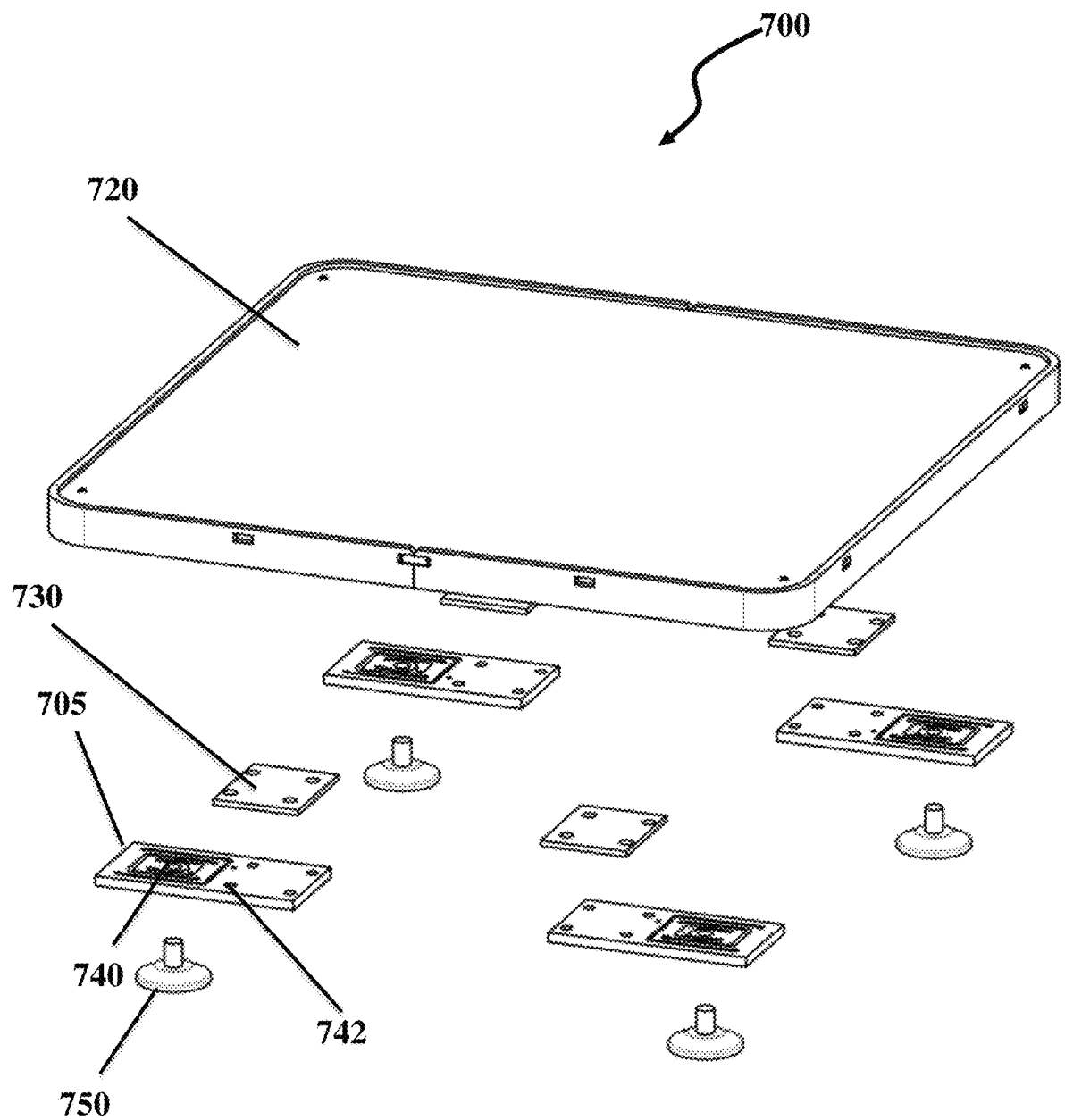
FIG. 11 is an exploded perspective view of a planar weighing scale or load cell assembly, according to embodiments of the present invention.

FIG. 11 is an exploded view of an exemplary weighing scale or load cell assembly 700, according to one embodiment of the present invention. Weighing scale 700 is typically a low-profile or (ultra-low profile) planar weighing scale, substantially as shown. Weighing scale 700 may include at least one load cell assembly such as load cell assembly 705 (e.g., 4 of load cell assemblies 105, as provided and described hereinabove), or at least one double-ended planar load cell assembly (as shown in FIG. 5B), by way of example, 2 of such double-ended planar load cell assemblies.

Weighing scale 700 has a solid top plate 720 disposed above load cell assemblies 705, which may attach to load cell assembly 705 via mounting holes or elements 742, with shims or adapter plates 730 disposed therebetween. In the embodiment shown in FIG. 7, each load cell assembly 705 is supported by a base such as weighing scale leg 750. In this embodiment, leg 750 may be attached to, or associated with, load cell assembly 705 via hole 740. Typically, an upper portion of leg 750, or an element associated therewith (not shown), may protrude up through hole 740.

Figure 12A:
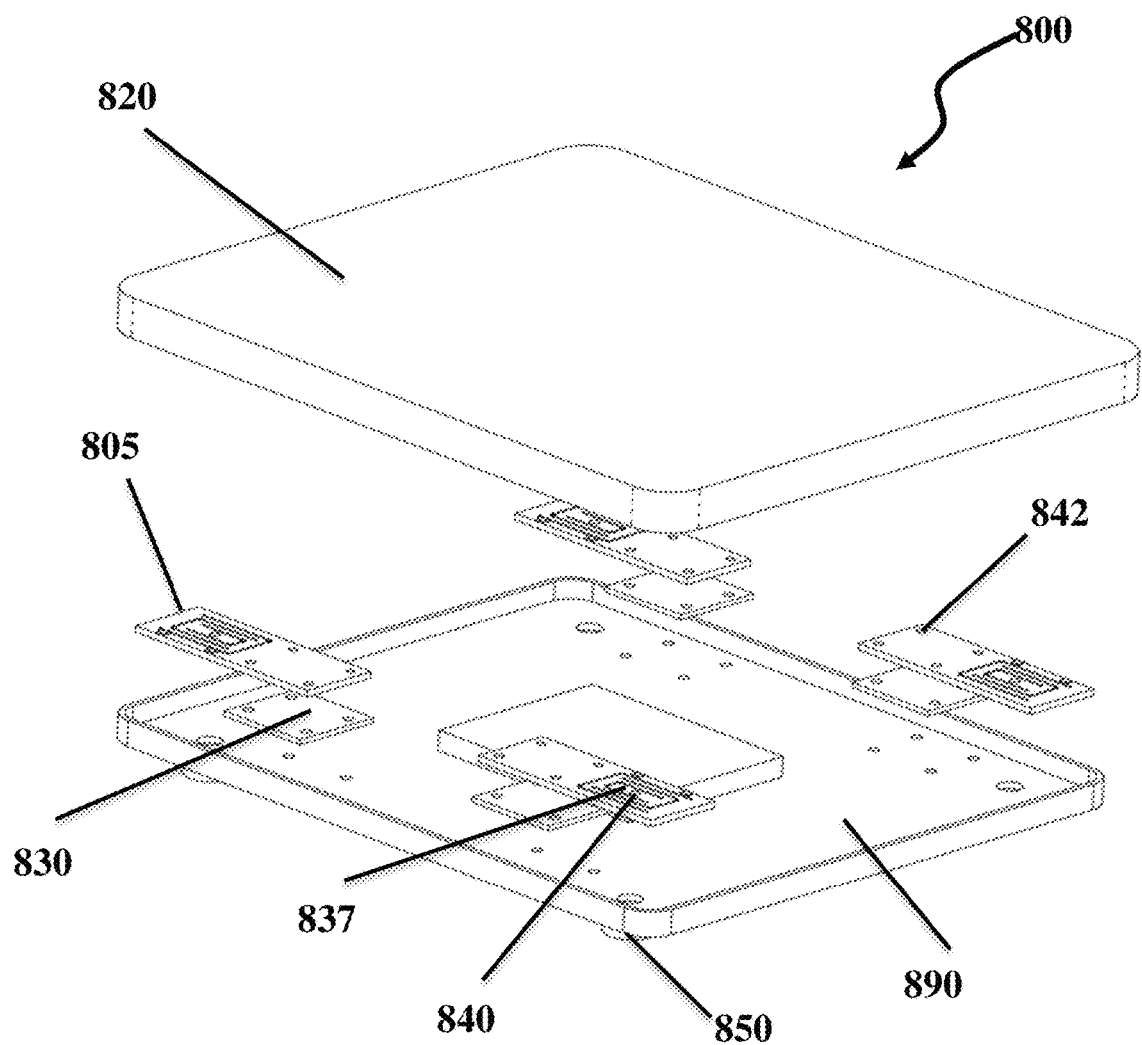
FIG. 12A is an exploded perspective view of a planar weighing scale or load cell assembly having a base plate, according to embodiments of the present invention.
Figure 12B:
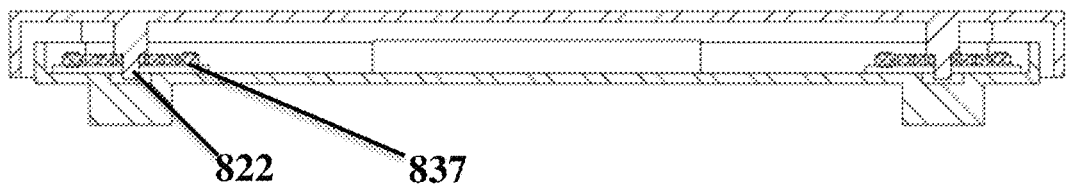
FIG. 12B is schematic cross-sectional view of the planar weighing scale or load cell assembly of FIG. 12A.

FIG. 12A is an exploded perspective view of a planar weighing scale or load cell assembly having a base plate, according to embodiments of the present invention. FIG. 12B is schematic cross-sectional view of the planar weighing scale or load cell assembly of FIG. 12A. With collective reference now to FIGS. 12A and 12B, each load cell assembly 805 may be attached to a (typically single) base plate or base element 890. Such a base plate 890 may support top plate or weighing surface 820 via at least one load cell assembly 805. In some embodiments, top plate or weighing surface 820 may integrally include, or be attached to, a protruding element 822, adapted to pass through hole 840 of load cell assembly 805, so as to deliver a load to loading element 837.

Base plate 890 may be supported by one or more supports such as leg 850, which may be further adapted to make contact with a flooring or flat surface. Each load cell assembly 805 is anchored to base plate or base element 890 via mounting holes or elements 842, e.g., using fastening elements such as bolts (not shown), and using shims or adapter plates 830, or the like, as necessary.

In the embodiment provided in FIGS. 3A-3B, load cell assembly 100 may be adapted, when secured within a weighing module (e.g., as described in FIG. 11 or in FIGS. 12A-12B), such that a vertical impact (e.g., an object that is slammed down with great force onto weighing platform 720) acts mainly upon flexures 127a-b and 117a-b, while measuring beams 107a-b remain largely or substantially completely unaffected. Thus, flexures 127a-b and 117a-b may serve as a vertical shock-protection mechanism for the measuring beams.

As used herein in the specification and in the claims section that follows, the terms "spring element" and "measuring beam" refer to a beam having one or more strain gages attached or directly attached therewith. Such strain gages are not considered to be part of the "spring element" or "measuring beam".

As shown in the figures and described herein, the spring element or measuring beam is disposed along a longitudinal section of the load cell body that is defined by a length of the cutout window of the spring element along the long dimension of the load cell body. The at least one strain gage associated with the spring element is longitudinally positioned within this longitudinal section of the load cell body, typically between this cutout window and the closest longitudinal edge (i.e., generally parallel to the longitudinal axis) of the load cell body.

As used herein in the specification and in the claims section that follows, the term "flexure beam", and the like, refers to a spring element that is devoid of strain gages.

As used herein in the specification and in the claims section that follows, the term "generally", with respect to orientations and measurements such as "parallel" and "central", is meant to limit the deviation to within ±10%. More typically, this deviation is within ±5%, ±3%, ±2%, ±1%, ±0.5%, ±0.2%, or less.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A planar load cell assembly comprising:
   at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis;
   each said load cell arrangement including:
   (a) a first contiguous cutout window passing through said broad dimension and formed by a first pair of cutout lines disposed parallel or generally parallel to said central longitudinal axis, and connected by a first cutout base;
   (b) a second contiguous cutout window passing through said broad dimension and formed by a second pair of cutout lines disposed parallel or generally parallel to said central longitudinal axis, and connected by a second cutout base;
   wherein said second contiguous cutout window is transversely bounded by said first contiguous cutout window;
   (c) a pair of measuring beams, disposed along opposite edges of said load cell body, and parallel or generally parallel to said central longitudinal axis, each of said measuring beams longitudinally defined by a respective cutout line of said first pair of cutout lines;
   (d) a first flexure arrangement having a first pair of flexure beams, disposed along opposite sides of said central longitudinal axis, and parallel or generally parallel thereto, said first pair of flexure beams longitudinally disposed between said first pair of cutout lines and said second pair of cutout lines, and mechanically connected by a first flexure base, said first pair of flexure beams being devoid of strain gages;
   (e) a loading element, longitudinally defined by an innermost pair of cutout lines, and extending from an innermost flexure base, said transverse axis passing through said loading element; and
   (f) at least one strain gage, fixedly attached to a surface of a measuring beam of said measuring beams.

2. The planar load cell assembly of claim 1, wherein said metal load cell body is made of a magnesium alloy, wherein a magnesium content of said magnesium alloy, by weight or by volume, is within a range of 85% to 98%.

3. The planar load cell assembly of claim 1, wherein said magnesium alloy is selected or adapted such that an elastic modules (E) thereof is lower than that of load-cell grade aluminum alloy 2023.

4. The planar load cell assembly of claim 1, wherein said loading element has a hole for receiving or supporting a load.

5. The planar load cell assembly of claim 4, wherein said hole is an elongate hole having a long dimension disposed along said central longitudinal axis.

6. The planar load cell assembly of claim 1, dimensioned such that a nominal load capacity is within a range of 1 to 500 kg.

7. The planar load cell assembly of claim 6, wherein, within said nominal load capacity and with the planar load cell assembly disposed in an operative mode, and with a load disposed on said loading element so as to achieve said nominal load capacity, said first pair of flexure beams exhibits a higher local stress with respect to a local stress in said measuring beams underneath said strain gage.

8. The planar load cell assembly of claim 6, wherein, with the planar load cell assembly disposed in an operative and with a load disposed on said loading element so as to achieve said nominal load capacity, an angle of a top surface of said loading element, with respect to horizontal, is within ±3°.

9. The load cell assembly of claim 1, wherein said at least one load cell arrangement includes a pair of said load cell arrangements sharing said load cell body, wherein each of said pair is disposed along different and non-overlapping longitudinal segments of said load cell body.

10. The load cell assembly of claim 1, wherein said first and second cutout windows are generally U-shaped or C-shaped.

11. The load cell assembly of claim 1, said broad dimension having rectangular top and bottom faces, and a uniform thickness.

12. The planar load cell assembly of claim 1, the planar load cell assembly having two of said load cell arrangements disposed on said single metal load cell body, and wherein said single metal load cell body has a central transverse axis centrally disposed along a longitudinal center of said central longitudinal axis, and wherein said load cell arrangements are disposed about said central longitudinal axis.

13. The planar load cell assembly of claim 1, the planar load cell assembly having two of said load cell arrangements disposed on said single metal load cell body, and wherein said single metal load cell body has a central transverse axis centrally disposed along said central longitudinal axis, and wherein said load cell arrangements are symmetrically disposed about said central longitudinal axis.

14. The planar load cell assembly of claim 1, wherein (i) said loading element is adapted to associate with one of a weighing platform of a weighing scale and a base of a weight scale, (ii) the planar load cell assembly further includes an anchoring region, (iii) said anchoring region is adapted to be anchored to said base if said loading element is adapted to associate with said weighing platform, and (iv) said anchoring region is adapted to be anchored to said weighing platform if said loading element is adapted to associate with said base.

15. The planar load cell assembly of claim 1, wherein each said load cell arrangement additionally includes:
(g) a third contiguous cutout window passing through said broad dimension and formed by a third pair of cutout lines disposed parallel or generally parallel to said central longitudinal axis, and connected by a third cutout base, said third contiguous cutout window being transversely bounded by said second contiguous cutout window; and
(h) a second flexure arrangement having a second pair of flexure beams, disposed along opposite sides of said central longitudinal axis, and parallel or generally parallel thereto, said second pair of flexure beams longitudinally disposed between said second pair of cutout lines and said third pair of cutout lines, and mechanically connected by a second flexure base.

16. The planar load cell assembly of claim 15, wherein said loading element, said second pair of flexure beams, said first pair of flexure beams, and said pair of measuring beams are mechanically disposed in series, such that a load disposed on said loading element acts upon said second pair of flexure beams prior to said first pair of flexure beams, and on said first pair of flexure beams prior to said pair of measuring beams.

17. The planar load cell assembly of claim 15, wherein a first measuring beam of said measuring beams, a first flexure beam of said first pair of flexure beams, and a first flexure beam of said second pair of flexure beams are all disposed on a first side of said central longitudinal axis, said first measuring beam having a length ($L_{mb}$) and a width ($W_{mb}$), said first flexure beam of said first pair of flexure beams having a length ($L_{F1}$) and a width ($W_{F1}$), and said first flexure beam of said second pair of flexure beams having a length ($L_{F2}$) and a width ($W_{F2}$); wherein dimensionless ratios $K_{mb}$, $K_{F1}$, and $K_{F2}$ are defined as:

$$K_{mb}=W_{mb}/L_{mb}; K_{F1}=W_{F1}/L_{F1}; \text{ and } K_{F2}=W_{F2}/L_{F2};$$

and wherein at least one of $K_{F1}/K_{mb}$ and $K_{F2}/K_{mb}$ is within a range of 0.75 to 1.25.

18. The planar load cell assembly of claim 15, wherein an end of said loading element, distal to said second flexure base, is unrestrained.

19. The load cell assembly of claim 15, wherein said first and second flexure arrangements are adapted to exhibit flexural behavior along both directions of said primary axis.

20. The load cell assembly of claim 15, wherein:
D3 is a length of said second flexure base, D3 being defined as a minimum distance, parallel to said central longitudinal axis, between said second cutout base and said third pair of cutout lines;
L3 is a length of said loading element parallel to said central longitudinal axis, between said third cutout window and a distal end of said third pair of cutout lines;
and wherein a ratio of L3/D3 is within a range of 3 to 7.

* * * * *